(12) United States Patent
Boelter et al.

(10) Patent No.: US 12,063,880 B2
(45) Date of Patent: Aug. 20, 2024

(54) HIGH OUTPUT PRECISION SPINNER

(71) Applicant: Highway Equipment Company, Cedar Rapids, IA (US)

(72) Inventors: Benjamin Dwayne Boelter, Cedar Rapids, IA (US); Don S. Samuelson, Laurent, IA (US); Tyler James Schlusemann, North Liberty, IA (US); Nathan Andrew Marks, North Liberty, IA (US)

(73) Assignee: Highway Equipment Company, Cedar Rapids, IA (US)

( * ) Notice: Subject to any disclaimer, the term of this patent is extended or adjusted under 35 U.S.C. 154(b) by 0 days.

(21) Appl. No.: 17/668,737

(22) Filed: Feb. 10, 2022

(65) Prior Publication Data

US 2022/0264792 A1    Aug. 25, 2022

Related U.S. Application Data

(60) Provisional application No. 63/150,247, filed on Feb. 17, 2021.

(51) Int. Cl.
| | | |
|---|---|---|
| *A01C 17/00* | (2006.01) | |
| *A01C 15/00* | (2006.01) | |
| *A01C 19/02* | (2006.01) | |
| *A01C 21/00* | (2006.01) | |

(52) U.S. Cl.
CPC .......... *A01C 17/008* (2013.01); *A01C 15/006* (2013.01); *A01C 17/001* (2013.01); *A01C 19/02* (2013.01); *A01C 21/005* (2013.01)

(58) Field of Classification Search
CPC ... A01C 17/008; A01C 17/001; A01C 15/006; A01C 19/02; A01C 21/005
USPC ............................................................ 239/7
See application file for complete search history.

(56) References Cited

U.S. PATENT DOCUMENTS

| 2,031,540 | A | 2/1936 | Macaulay |
| 9,206,563 | B1 | 12/2015 | Rissi et al. |
| 9,649,646 | B1 | 5/2017 | Podoll et al. |
| 2020/0384496 | A1 | 12/2020 | Gray et al. |

FOREIGN PATENT DOCUMENTS

| DE | 1757835 A1 | 6/1971 |
| DE | 1457867 C | 4/1973 |
| EP | 0873678 A1 | 10/1998 |
| EP | 1542525 A1 | 6/2005 |
| EP | 2286652 A3 | 1/2013 |
| EP | 2454928 B1 | 10/2013 |
| GB | 1045370 A | 10/1966 |

OTHER PUBLICATIONS

PCT/US2022/015968 filed Feb. 10, 2022—International Search Report and Written Opinion dated Jun. 24, 2022.

*Primary Examiner* — Chee-Chong Lee
(74) *Attorney, Agent, or Firm* — Simmons Perrine Moyer Bergman PLC

(57) ABSTRACT

Method for a centrifugal spreader to precisely spread particulate material across an entire field with increased application rate, swath width and driving speed by utilizing a tiered disk spinner arrangement fed by a conveyor and guided by a material divider and an adjustable chute moveable in rotation around the spinner disk to achieve a desired symmetrical or asymmetrical spread pattern.

7 Claims, 27 Drawing Sheets

HIGH OUTPUT PRECISION SPINNER

CROSS-REFERENCE TO RELATED APPLICATION

This application claims the benefit of the filing date of the provisional patent application filed by the same inventors on Feb. 17, 2021, and having Ser. No. 63/150,247, which application is incorporated herein by reference in their entirety.

BACKGROUND OF INVENTION

The invention relates to centrifugal spreaders, and more specifically to the spinner and the material delivery system for centrifugal spreaders.

Two main classes of centrifugal spreaders are often used for applying granular fertilizer, European and high output spreaders. Modern European spreaders often have a W-shaped funnel storage container with at least two metering orifices at the bottom that are adjustable rotationally around the bottom in which granular fertilizer is gravity fed through, below which are mounted at least two rotary-driven centrifugal disks with throwing vanes (referred to herein as the spinner). An example of this spreader is described in patent document EP2286652B1. As taught in patent document EP2454928B1, granular fertilizer may also be guided from the storage container to the disk by a chute. Modern high output spreaders often convey material from a bin into an orifice below the conveyor and onto two rotary-driven centrifugal disks with throwing vanes (referred to herein as the spinner). The orifice and spinner are adjustable side to side as well as longitudinally as described in patent document U.S. Pat. No. 9,649,646B1.

A challenge when applying granular fertilizer with a centrifugal spreader is the number of acres that can be covered each day. This challenge is only getting bigger with skilled labor shortages and the number of days suitable for fieldwork. A need therefore exists for a cost-effective method to cover more acres, faster, and with fewer errors. Additional benefits of this would be the reduction of expensive fuel and fertilizer, soil compaction, and time spent spreading each acre resulting in a significantly higher return on the spreader investment.

To try to solve this problem, spreader manufactures have developed solutions to spread granular fertilizer wider (swath width, feet) which allows the spreader to cover more aces per a pass. Another solution is to spread granular fertilizer faster (travel speed, mph) which also allows the spreader to cover more acres faster. One of the known limitations of spreading both wide and fast is being able to also spread an application rate (pounds/acre) that meets the field's nutrient requirement (pounds/acre).

One of the known difficulties of high throughput spreaders is known as the "mass effect" and its influence on the quality of the spread pattern. What is needed in the art is a spreader with a solution to the "mass effect".

Furthermore, there is a need to provide a method for increasing the swath width, travel speed, material throughput and precision of a spreader in a simple and effective manner.

What is needed in the art is a spreader that can spread a field's nutrient requirement at a wide swath width and high travel speed that allows precision spreading with precise control of the granular fertilizer placement onto the field.

European spreaders often produce wider swath widths than high output spreaders which allow them to cover more acres per a pass but are often limited in their material throughput (cubic feet per minute, cfm). A spreader's material throughput (cfm) is the total amount of granular material deposited onto the spinner. Throughput of some European spreaders are limited by how fast material can gravity flow from the funnel shaped bin through the orifice on the bottom and onto the spinner. Throughput for these types of spreaders often maxes out at 22 cfm. Typical high output spreaders convey material from a bin into an orifice below the conveyor and onto the spinner and are capable of higher throughput due to the increased acceleration imparted on the granular material by the conveyor. Throughput for these types of spreaders often maxes out at 40 cfm. Material throughput (cfm) can be calculated from the following equation:

$$\left[ \frac{\left[\text{spreader application rate}\left(\frac{\text{pounds}}{\text{acre}}\right)\right] \times [\text{swath width (feet)}] \times [\text{travel speed (mph)}]}{\left[\text{fertilizer density}\left(\frac{\text{pounds}}{\text{feet}^3}\right)\right] \times 495} \right]$$

The factor 495 converts acres and mph to cfm and is derived by multiplying the number of square feet in an acre 43,560, by the number of minutes in an hour, 60 minutes, and dividing by the number of feet in a mile, 5,280.

The maximum rate (pounds/acre) a spreader can apply is dependent on the maximum material throughput (cfm), swath width (feet), travel speed (mph) and fertilizer being applied. Typical European spreaders with a maximum throughput of 22 cfm and a swath width of 177 feet (54 meters) applying fertilizer with a density of 65 pounds/feet$^3$ and traveling at 20 mph can apply a maximum rate of 200 pounds/acre. Typical high output spreaders with a maximum throughput of 40 cfm and a swath width of 90 feet applying fertilizer with a density of 65 pounds/feet$^3$ and traveling at 28 mph can apply a maximum rate of 515 pounds/acre.

The field capacity of a spreader is the number of acres that can be spread per an hour and is a function of the swath width (feet) and travel speed (mph). A spreaders field capacity (acres/hour) can be calculated from the following equation:

$$[\text{swath width (feet)}] \times [\text{travel speed (mph)}] \times \left[\frac{5{,}280\left(\frac{\text{feet}}{\text{mile}}\right)}{43{,}560\left(\frac{\text{square feet}}{\text{acre}}\right)}\right]$$

A typical European spreader with a swath width of 177 feet (54 meters) and a travel speed of 20 mph results in 429 acres/hour. A typical high output spreader with a swath width of 90 feet and a travel speed of 28 mph results in 305 acres/hour.

A spreaders overall efficiency in applying granular fertilizer can be calculated from the following equation:

$$\left[\frac{\text{field size (acres)}}{\text{spreader field capacity}\left(\frac{\text{acres}}{\text{hour}}\right)}\right] \times \left[\frac{\text{field nutrient requirement}\left(\frac{\text{pounds}}{\text{acre}}\right)}{\text{spreader application rate}\left(\frac{\text{pounds}}{\text{acre}}\right)}\right]$$

A field's nutrient requirement (pounds/acre) is dependent on the soil fertility. Soil testing is a critical component in determining nutrients that are already available and those that may be in limited supply. One way to improve efficiency of fertilizer inputs is by using variable rate technologies (VRT) that allocates fertilizers across the field according to specific needs in different areas. VRT that ties GPS information and the spreader's capability together are then used to vary the rate of fertilizer applied to the field, resulting in the strategic placement of nutrients.

The following are hypothetical examples on how to apply the above equations to European and high output spreaders to determine their respective overall efficiency:

Applying the above equations to a 1,000-acre field requiring a constant nutrient application of 500 pounds/acre, a typical European spreader with a maximum throughput of 22 cfm and a swath width of 177 feet (54 meters) applying fertilizer with a density of 65 pounds/feet$^3$ and traveling at 20 mph can apply a maximum rate of 200 pounds/acre and has a maximum possible field capacity of 429 acres/hour. Its overall efficiency in applying fertilizer to this field is 5.8 hours and requires the spreader to perform a triple pass through the field to achieve the desired field nutrient application of 500 pounds/acre.

If the European spreader's application rate is adjusted to 500 pounds/acre to perform a single pass through the field, the field capacity would be reduced to 172 acres/hour and the travel speed to 8 mph. Its overall efficiency in applying fertilizer in this configuration still results in 5.8 hours.

A typical high output spreader with a maximum throughput of 40 cfm and a swath width of 90 feet applying fertilizer with a density of 65 pounds/feet$^3$ and traveling at 28 mph can apply a maximum rate of 515 pounds/acre and has a maximum possible field capacity of 305 acres/hour. Its overall efficiency in applying fertilizer to this field is 3.3 hours and is performed during a single pass, 2.5 hours faster than a typical European spreader.

Other known prior patents relating to delivery of fertilizer to the spinner are included in the examples below.

By patent document EP1542525B1, a gravity fed double disk centrifugal fertilizer spreader is known which has dual storage containers, each assigned with a metering member. Each storage container is supplied with rotatably driven centrifugal disks in which the disks are arranged one above the other and whose axes of rotation coincide. The upper disk has a central void through which material can be guided from the metering orifice to the lower disk by means of a guide element. The upper and lower disks and associated throwing vanes preferably have different outer diameters and lengths, respectively. The objective of the invention is to easily switch from distributing fertilizer in a common wide distribution to border spreading, producing on the side facing the border a distribution pattern with a steeply sloping stray edge and vice versa, without having to replace disks or throwing vanes. This is accomplished by the common and border spreading disks being stacked directly above one another forming a double disk and the centrifugal fertilizer spreader can easily be converted from common to border spreading by means of the corresponding routing of the material to the upper or lower spreading disk. This spreader is capable of precision spreading with precise control of granular fertilizer placement onto the field at a wide swath width, however material throughput is limited by how fast material can gravity flow from the metering orifices. The restricted material throughput limits the travel speed and application rate that can be achieved with this spreader and ultimately the overall efficiency of acres that can be spread in a day. It is also not possible to meter material to both the top and bottom discs simultaneously, which could be advantageous to reduce the mass effect as well as achieving uniform spreading with some types of fertilizers or fertilizer blends.

By patent document EP0873678A1, a gravity fed double disk centrifugal fertilizer spreader is known which has dual storage containers with partitions dividing the storage containers into three separate storage containers, capable of carrying at least two different types of fertilizer. Each storage container is supplied with its own metering member and guide element. Each storage container is supplied with rotatably driven centrifugal disks in which the disks are arranged one above the other and whose axes of rotation coincide. The upper centrifugal disk has a central void through which material can be guided from the metering opening to the lower disk by means of guide elements. The upper and lower disks and associated throwing vanes have the same outer diameters and lengths, respectively. The objective of the invention is to distribute different types of fertilizer simultaneously to achieve a uniform distribution across the entire swath width. This is accomplished by distributing the different types of fertilizers at different heights. This spreader is capable of precision spreading with precise control of granular fertilizer placement onto the field at a wide swath width, however material throughput is limited by how fast material can gravity flow from the metering orifices. The restricted material throughput limits the travel speed and application rate that can be achieved with this spreader and ultimately the overall efficiency of acres that can be spread in a day. In addition, border spreading is not possible with this design.

By patent document DE1757835U, a fertilizer spreader with tiered discs of different diameters arranged one above the other to distribute material is known. The different diameters of the discs and throwing vane lengths cause a different circumferential speed, therefore different spreading width. The upper centrifugal disk has a central void through which material can be guided from the metering opening to the lower disk. The objective of the invention is to achieve a uniform spread pattern. This spreader is capable of precision spreading with precise control of granular fertilizer placement onto the field at a wide swath width, however material throughput is limited by how fast material can gravity flow from the metering orifice. The restricted material throughput limits the travel speed and application rate that can be achieved with this spreader and ultimately the overall efficiency of acres that can be spread in a day. In addition, border spreading is not possible with this design.

By patent document DE1457867A1, a triple tiered centrifugal disk is known that has throwing vanes on each level. The upper and middle disk has a central void through which material can be guided from the metering opening to each disk by means of guide elements. The objective of the invention is to produce a uniform spread pattern. Such spreaders are also known from patent document GB1045370A. This spreader is capable of precision spreading with precise control of granular fertilizer placement onto the field at a wide swath width, however material throughput is limited by how fast material can gravity flow from the metering orifices. The restricted material throughput limits the travel speed and application rate that can be achieved with this spreader and ultimately the overall efficiency of acres that can be spread in a day. In addition, border spreading is not possible with this design.

By patent document EP2454928B1, a gravity fed spreader is known that delivers product from the storage container to the spinner by a chute. The chute is adjustable in rotation around the disk to take into account the specific characteristics of the product to be spread. Once a desirable spread pattern is achieved, the chute does not need to be adjusted if the material throughput changes due to its asymmetric shape. The asymmetric shape of the chute delays the feed point on the disk when the throughput is low and advances it when it is high. However, material throughput is limited by how fast material can gravity flow from the metering orifices. The restricted material throughput limits the travel speed and application rate that can be achieved with this spreader and ultimately the overall efficiency of acres that can be spread in a day. If the metering orifices were capable of increased material throughput, the chute and spinner throwing vanes would not be able to handle the increased volume and would reduce the precision of fertilizer placement onto the field.

SUMMARY OF THE INVENTION

Accordingly, an objective of the present invention is an improved particulate material spreader that achieves proper placement of product onto a field, lawn or other area with relationship to the line of travel with increased application rate, swath width and driving speed while maintaining a precise spread pattern.

A feature of the present invention is to provide a centrifugal disk system in which the mass effect is significantly reduced.

A feature of the present invention is to easily switch from low to high application rates and narrow and widespread widths at various driving speeds without having to change centrifugal disks or throwing vanes.

A feature of the present invention is to easily switch from common to border spreading and vice versa, without having to replace centrifugal disks, changing throwing vanes, changing the angular position of the throwing vanes, employing a deflector or rotating the centrifugal disks in the opposite direction.

A feature of the present invention is to spread a variety of particulate materials simultaneously at widespread widths while maintaining uniform distribution.

A feature of the present invention is to individually control each material drop point onto each centrifugal disk at a point that aids proper placement onto the field, lawn, or other area by rotating around the disk.

A feature of the present invention is to individually control the flow of material onto each centrifugal disk by turning the supply on/off based on inputs from a prescription map, field boundaries and already-applied areas by turning the respective conveyor on/off.

A feature of the present invention is to provide a material drop point system in which the material to be spread is fanned out onto each centrifugal disk at low application rates.

A feature of the present invention is to provide a centrifugal disk system in which the stray effect of material caused by the throwing vanes cutting through the particulate material jet is significantly reduced.

A feature of the present invention is to provide an improved particulate material spreader capable of adjusting the distribution of particulate material to the outermost part of the pattern to aid in turn and hill compensation.

A feature of the present invention is to independently control the rpm of each centrifugal disk.

A feature of the present invention is to provide an improved particulate material spreader capable of adjusting the distribution of particulate material based on wind conditions.

The present invention comprises a centrifugal spreader comprising:
 a storage container having a plurality of discharge ends;
 a plurality of conveyors to transport particulate material from said storage container to a material divider;
 said material divider mounted below said discharge end, positioned to receive material therein and having a plurality of outlet orifices;
 a first flow directing member;
 a second flow directing member;
 said first flow directing member and said second flow directing member mounted below said outlet orifices, positioned to receive material therein and having a plurality of flow directing outlet orifices;
 a spinner mounted below said flow directing outlet orifices, and positioned to receive material therein;
 said spinner having a plurality of centrifugal disks disposed one above the other;
 wherein the bottom centrifugal disk and middle centrifugal disk include a plurality of throwing vanes;
 wherein the top centrifugal disk and said middle centrifugal disk include a central void for the through passage of said particulate material to be distributed from said first flow directing member and said second flow directing member to the middle centrifugal disk and bottom centrifugal disk;
 said first flow directing member and said second flow directing member having a plurality of internal walls;
 wherein said plurality of internal walls are formed so that the flow of said particulate material evenly distributes across region of said flow directing outlet orifices starting at the center and filling in away from center as flow increases;
 said first flow directing member and said second flow directing member are configured to move independently from each other;
 said first flow directing member and said second flow directing member are moveably connected to a plurality of actuators; and
 wherein said first flow directing member and said second flow directing member are configured to selectively direct said particulate material around said spinner to said middle centrifugal disk and said bottom centrifugal disk.

Another embodiment of the invention comprises a centrifugal spreader comprising:
 a storage container having a plurality of discharge ends;
 a material divider mounted below said discharge ends, positioned to receive material therein;
 means for conveying material from said discharge ends to said material divider;
 said material divider having a plurality of outlet orifices;
 a first flow directing member;
 a second flow directing member;
 said first flow directing member and said second flow directing member mounted below said outlet orifices, positioned to receive material therein;
 said first flow directing member and said second flow directing member having a plurality of flow directing outlet orifices;
 a plurality of spinners each positioned below one of said plurality of flow directing outlet orifices; and said first flow directing member and said second flow directing member configured for adjusting flow of material around said spinner in a variable manner independently from each other.

Yet another embodiment of the invention comprises a method for a centrifugal spreader to precisely spread particulate material across an entire field with increased application rate, swath width and driving speed comprising the steps of:
providing a conveyor;
providing a spinner;
providing a first flow directing member;
providing a second flow directing member;
providing a material divider;
distributing said particulate material in a non-static asymmetrical pattern for one of; a last pass, field boundary condition, an angled headland, an irregular field profile, and narrowed swath across said field;
distributing said particulate material in a non-static symmetrical pattern across said field utilizing a back-and-forth pattern; and
conveying said particulate material onto said spinner utilizing said conveyor, said first flow directing member, said second flow directing member, and said material divider.

DETAILED DESCRIPTION

Figure 1:
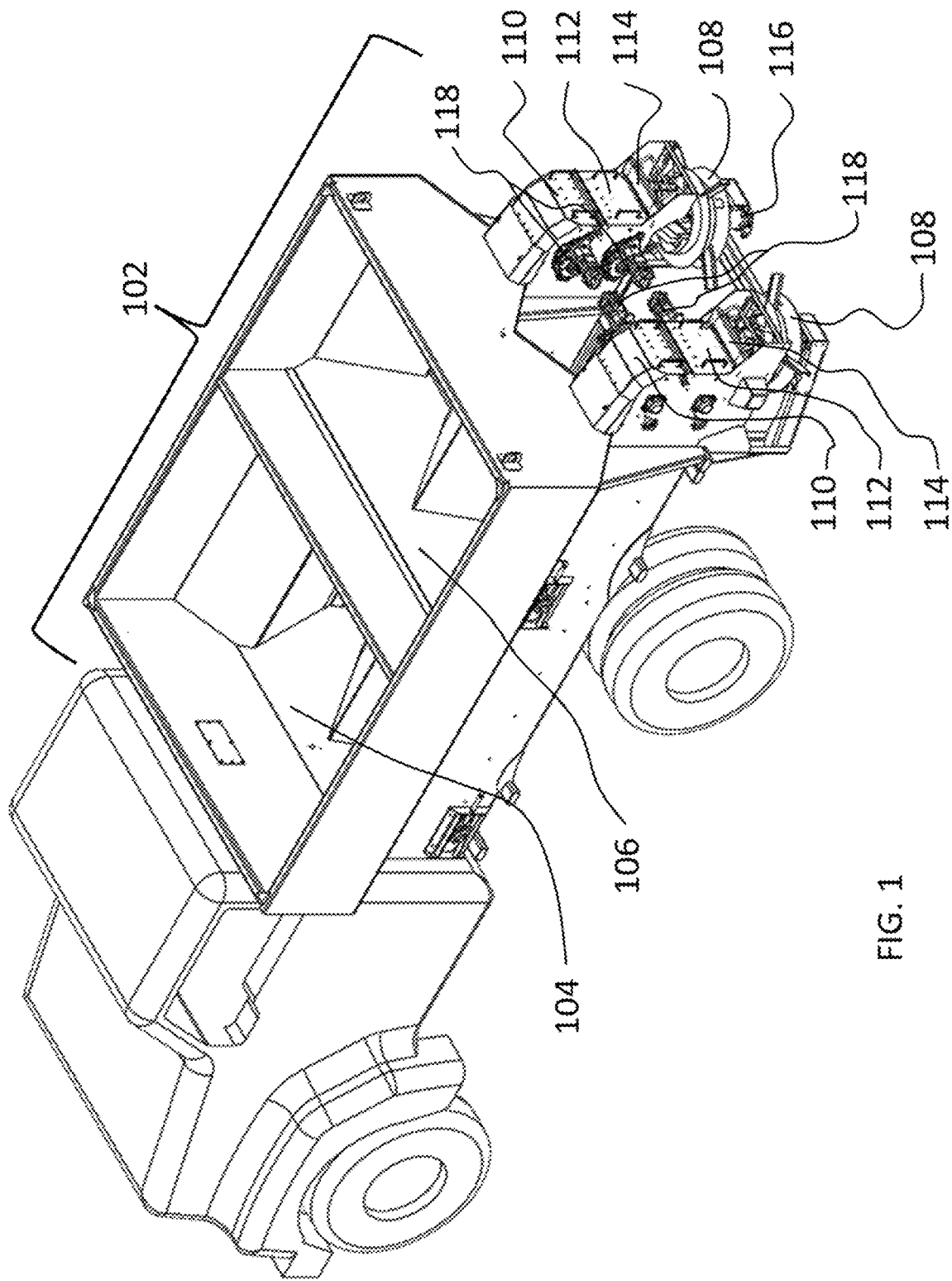
FIG. 1 is a perspective view of a truck mounted spreader with multiple storage containers in accordance with one embodiment.
Figure 2:
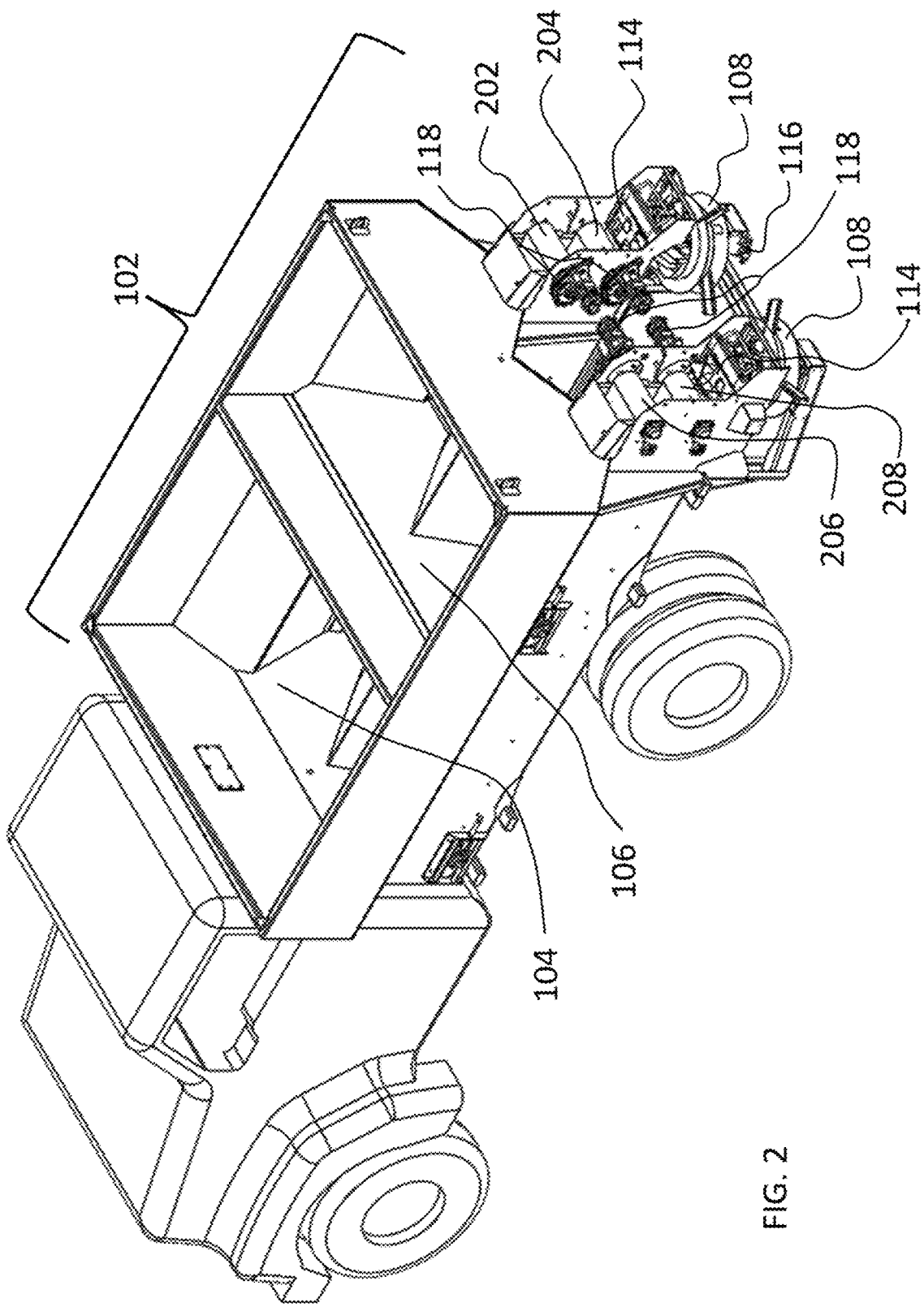
FIG. 2 shows a similar spreader with the waterfall dividers removed showing detail of conveyor discharge ends in accordance with one embodiment.
Figure 3:
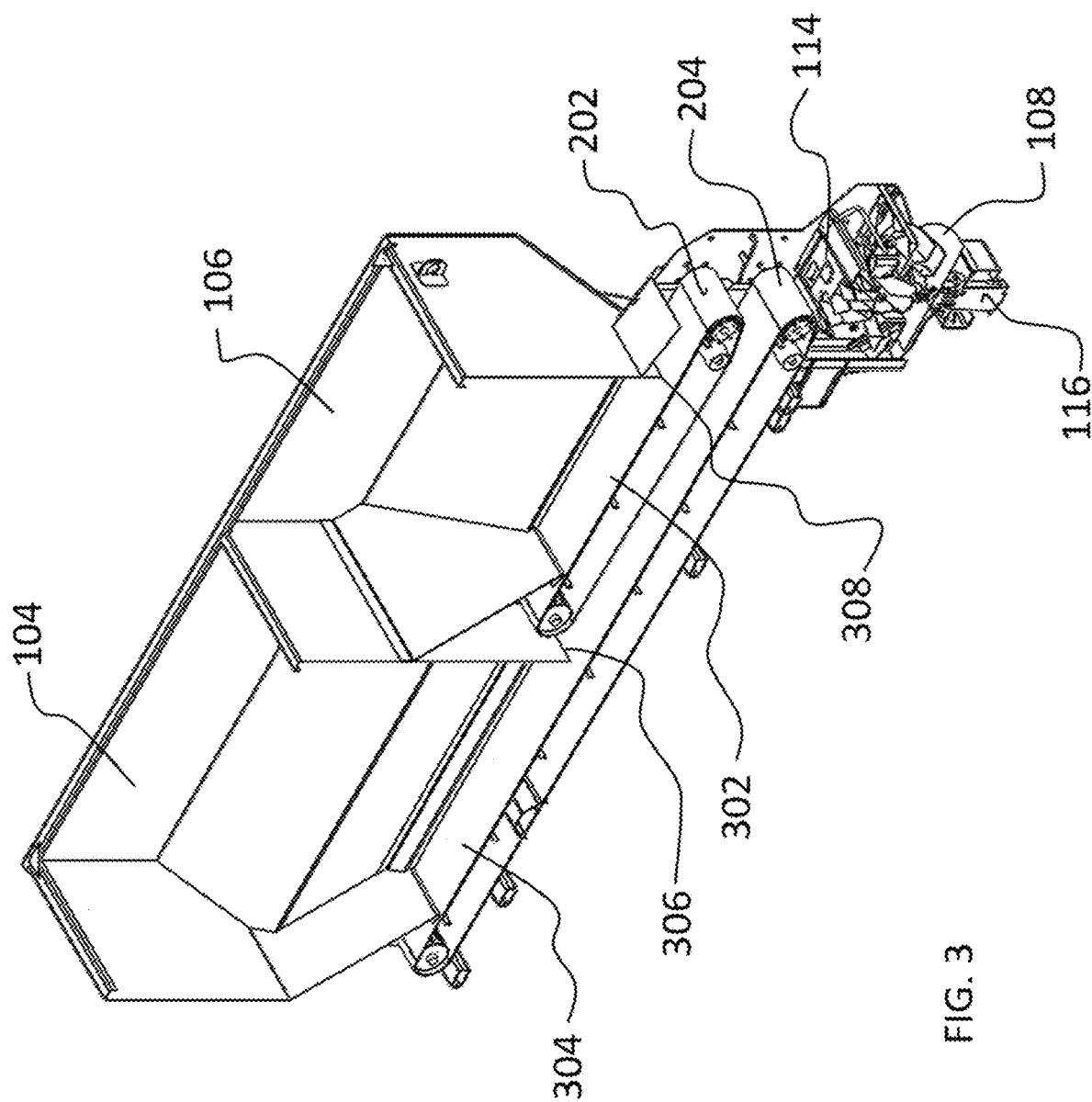
FIG. 3 is a sectioned view of FIG. 2 showing detail of right-hand storage container conveyors in accordance with one embodiment.
Figure 4:
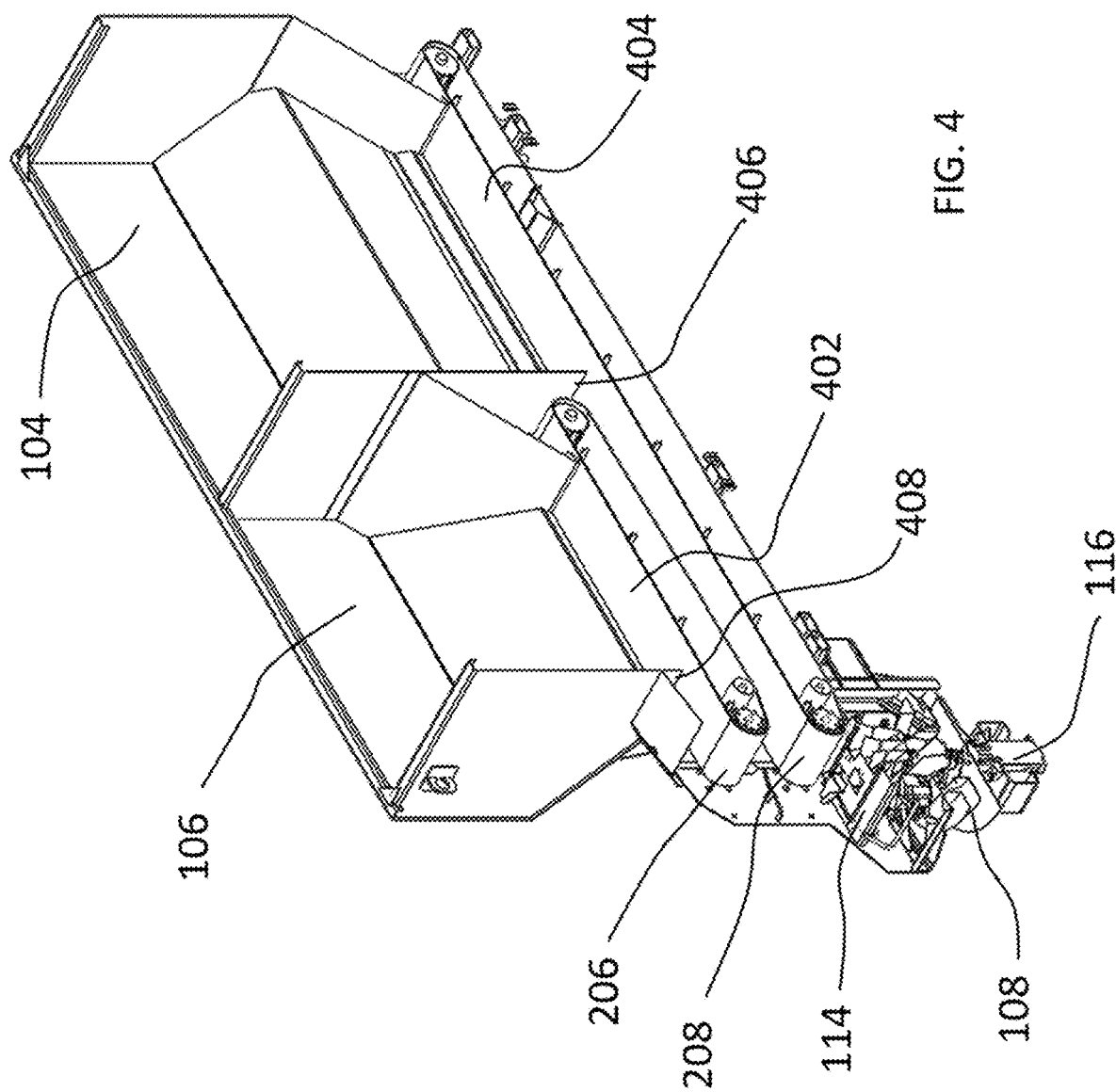
FIG. 4 is a sectioned view of FIG. 2 showing detail of left-hand storage container conveyors in accordance with one embodiment.

FIGS. 1 to 4 show perspective views of a truck mounted multi-compartment spreader 102 according to one embodiment comprising multiple material storage bins, containers, compartments, or storage containers 104 and 106 capable of holding different materials. The rear storage container 106 is disposed rearwardly within the front storage container 104 and each contain two independent endless conveyors 302, 304, 402 and 404, capable of transporting particulate material from each storage container 104 and 106 through fixed openings 306, 308, 406 and 408 to the conveyor discharge ends 202, 204, 206, and 208. The rear storage container conveyors 302 and 402 are disposed above the front storage container conveyors 304 and 404. Mounted under the conveyor discharge ends 202, 204, 206, and 208 are material dividers 114. Between the conveyor discharge ends 202, 204, 206, and 208 and the material dividers 114 are waterfall dividers 110 and 112 (hidden in FIGS. 2 to 4 for clarity). Mounted under the material dividers 114 are centrifugal disks 108 (referred to herein as the spinner). The spinner is rotary driven by motor 116 and the conveyors are rotary driven by motor 118. The spinner drive motor 116 and conveyor drive motor 118 are in the embodiment of hydraulic motors, which are connected via not shown hydraulic lines and control elements.

It shall remain understood that an alternative embodiment can employ a single storage container for holding a single material.

Figure 5:
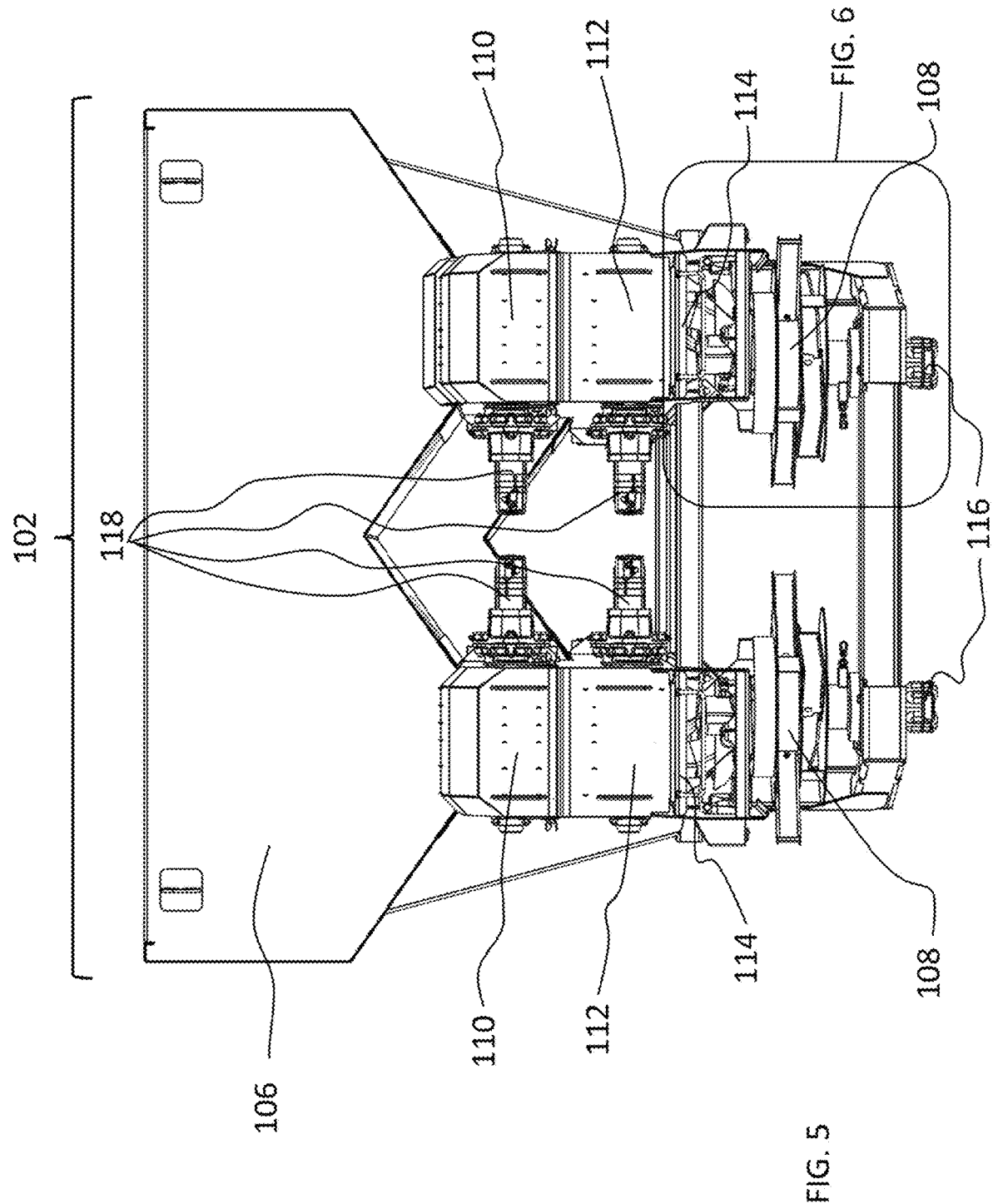
FIG. 5 is an end view of FIG. 1 showing detail of the spreader structure, conveyor drive motors, spinners and spinner drive motors in accordance with one embodiment.
Figure 6:
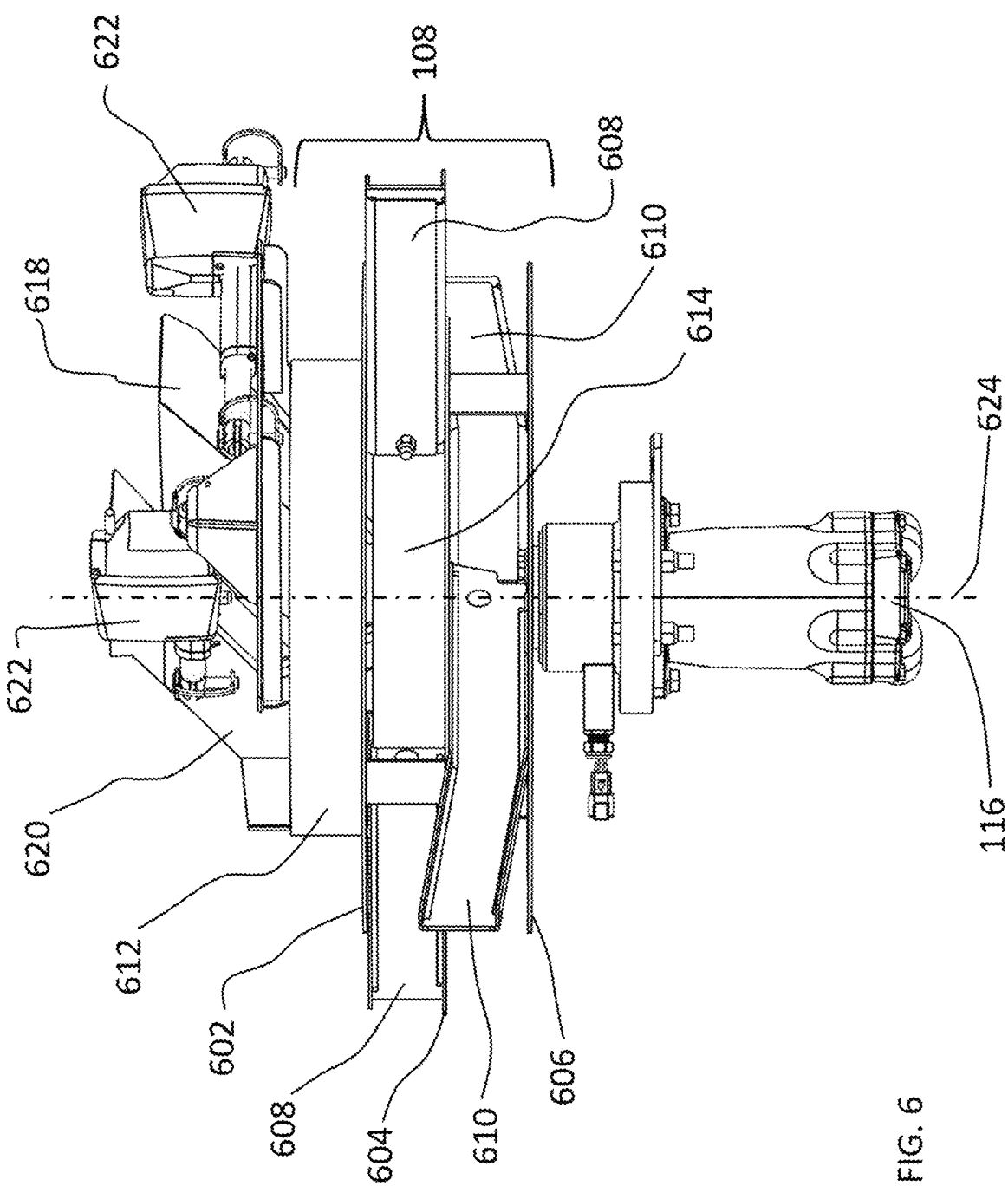
FIG. 6 shows various aspects of the right-hand spinner, chutes and drive mechanisms in accordance with one embodiment.
Figure 7:
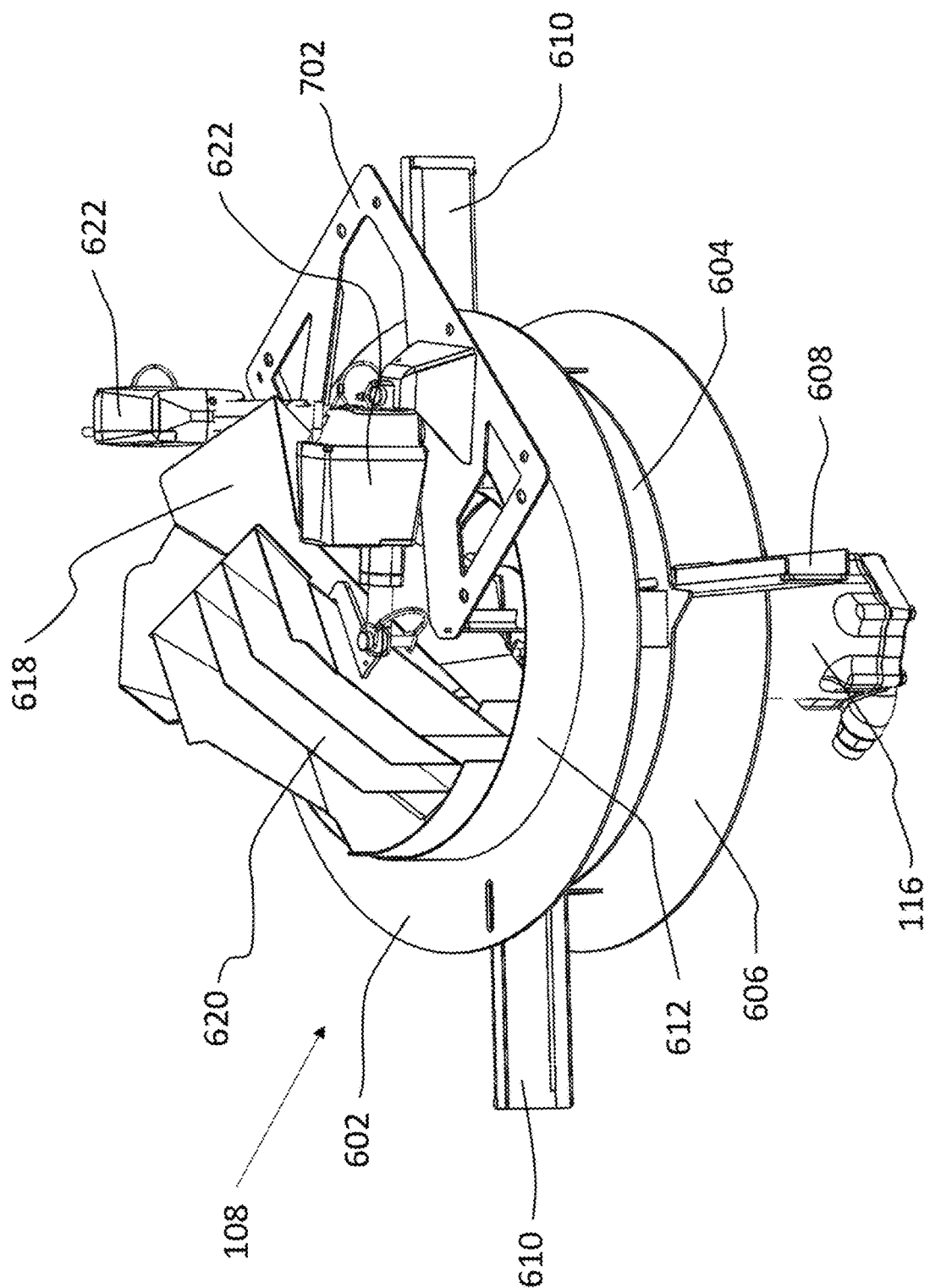
FIGS. 7 and 8 show isometric views of FIG. 7 showing detail of the right-hand spinner, chutes and drive mechanisms in accordance with one embodiment.
Figure 8:
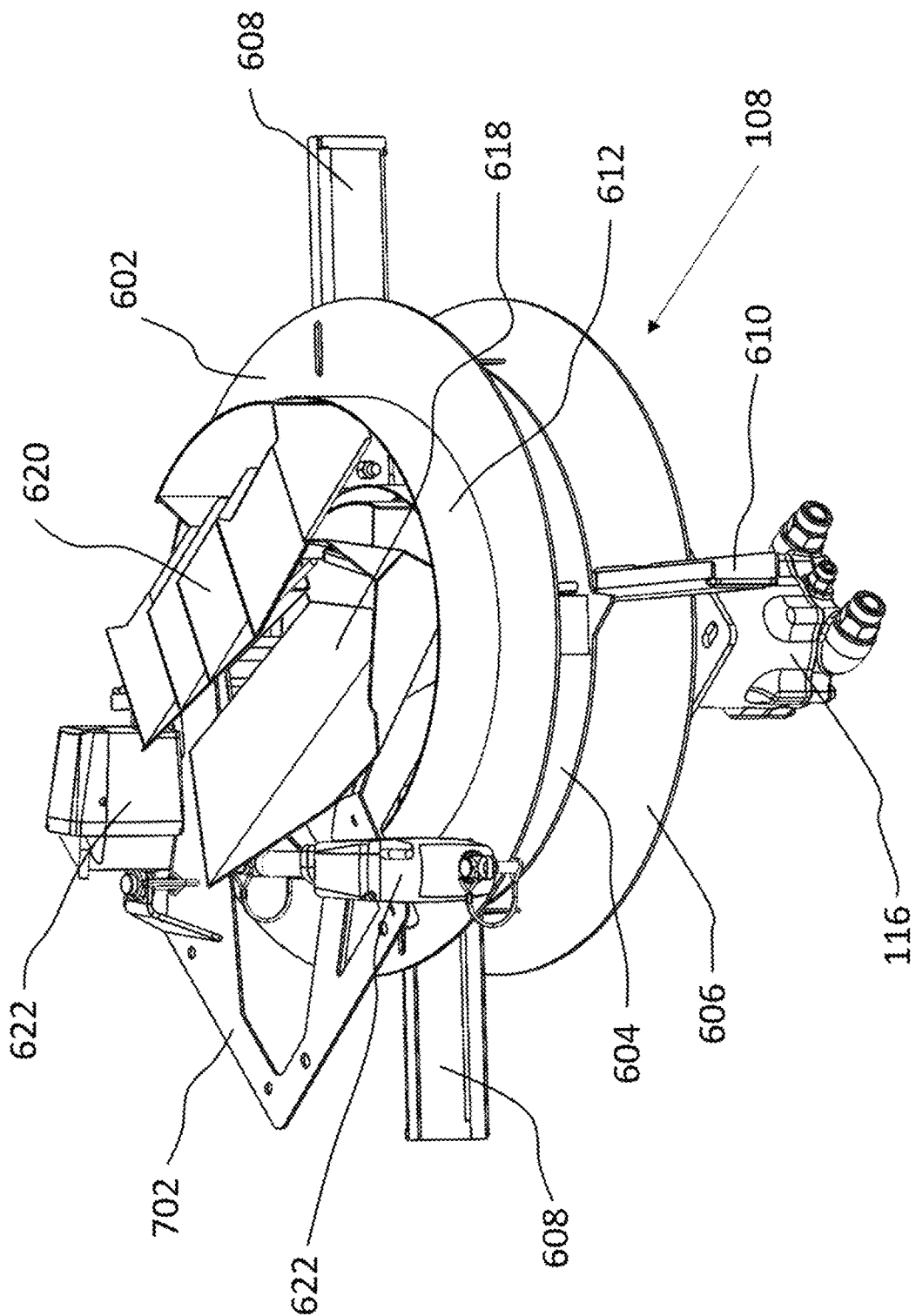
Figure 9:
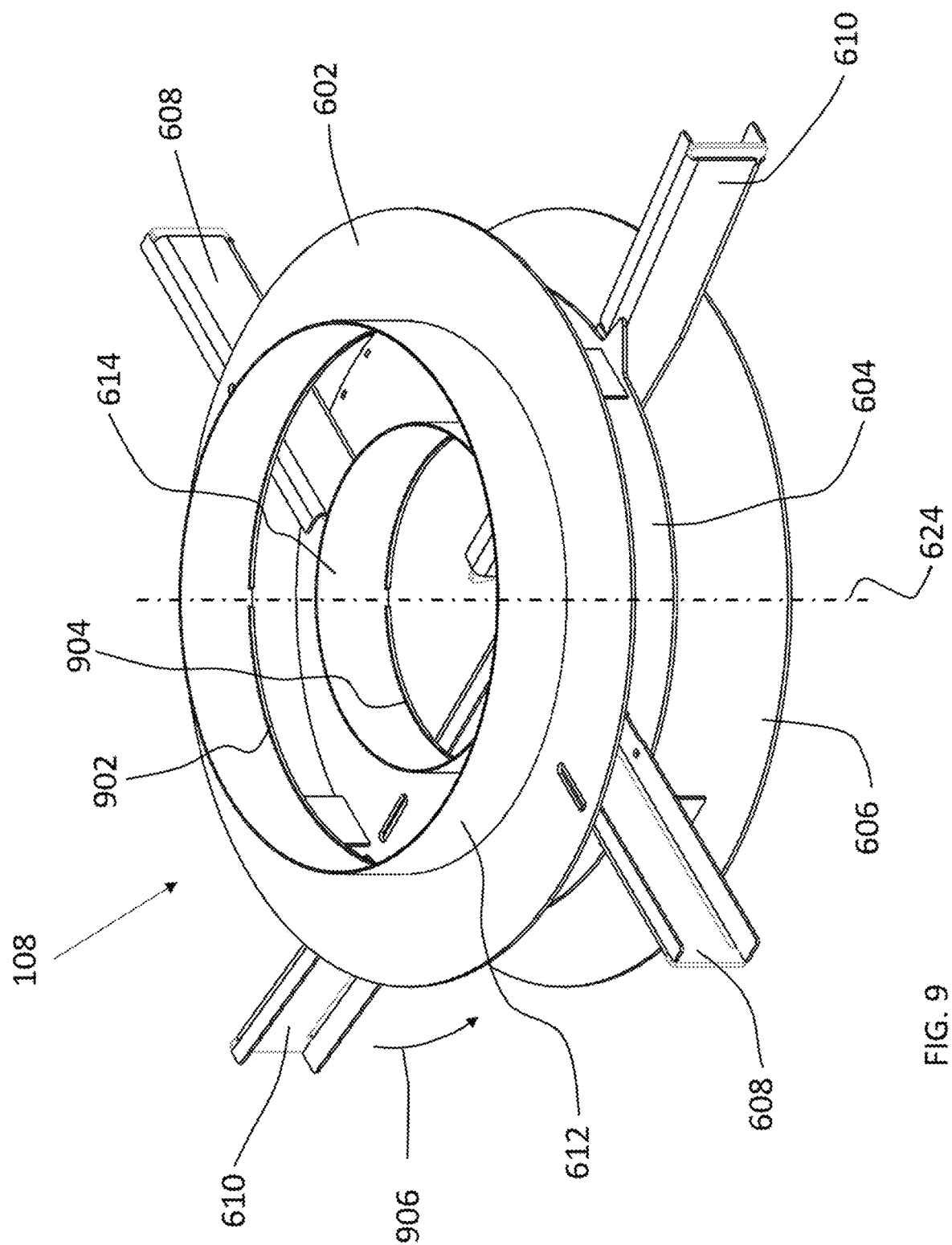
FIGS. 9 and 10 show detail of the right-hand centrifugal disk in accordance with one embodiment.
Figure 10:
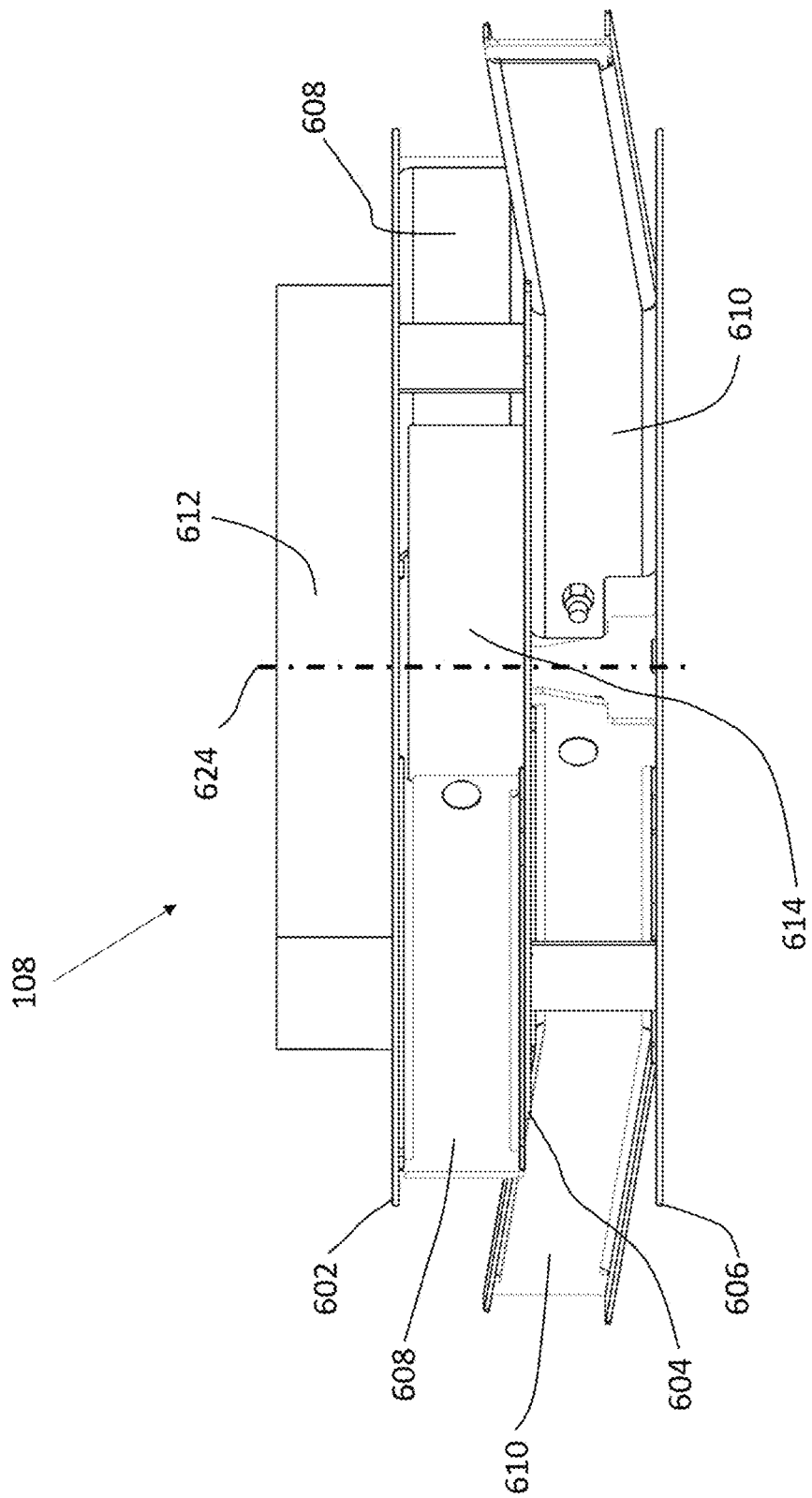

FIG. 5 shows an end view of the spreader 102 with additional detail of the spreader structure, conveyor drive motors 118, spinners 108 and spinner drive motors 116.

FIGS. 6 to 10 shows detail of the right-hand spinner 108 and how material is delivered to it from the material divider 114. Mounted between the spinner 108 and material divider 114 are inner and outer chutes 618 and 620 and are supported by a support frame 702 that is mounted below the material divider 114. The chutes 618 and 620 are rotatably adjustable by drive element 622 around the spinner 108 that coincides with a vertical rotational axis 624. The spinner 108 comprises of three rotary driven centrifugal disks 602, 604 and 606 forming one staked disk 108 disposed one above the other with throwing vanes 608 and 610 in two levels. The top centrifugal disk 602 has a central void 902 and middle centrifugal disk 604 has a central void 904 to allow the chutes 618 and 620 to drop material onto the middle centrifugal disk 604 and bottom centrifugal disk 606. Mounted above the top and middle centrifugal disks 602 and 604, respectively, are top and middle centrifugal shrouds 612 and 614, respectively. Mounted between the bottom centrifugal disk 606 and middle centrifugal disk 604 are throwing vanes 610. Mounted between the middle centrifugal disk 604 and top centrifugal disk 602 are throwing vanes 608. The spinner 108 rotates counterclockwise 906.

Figure 11:
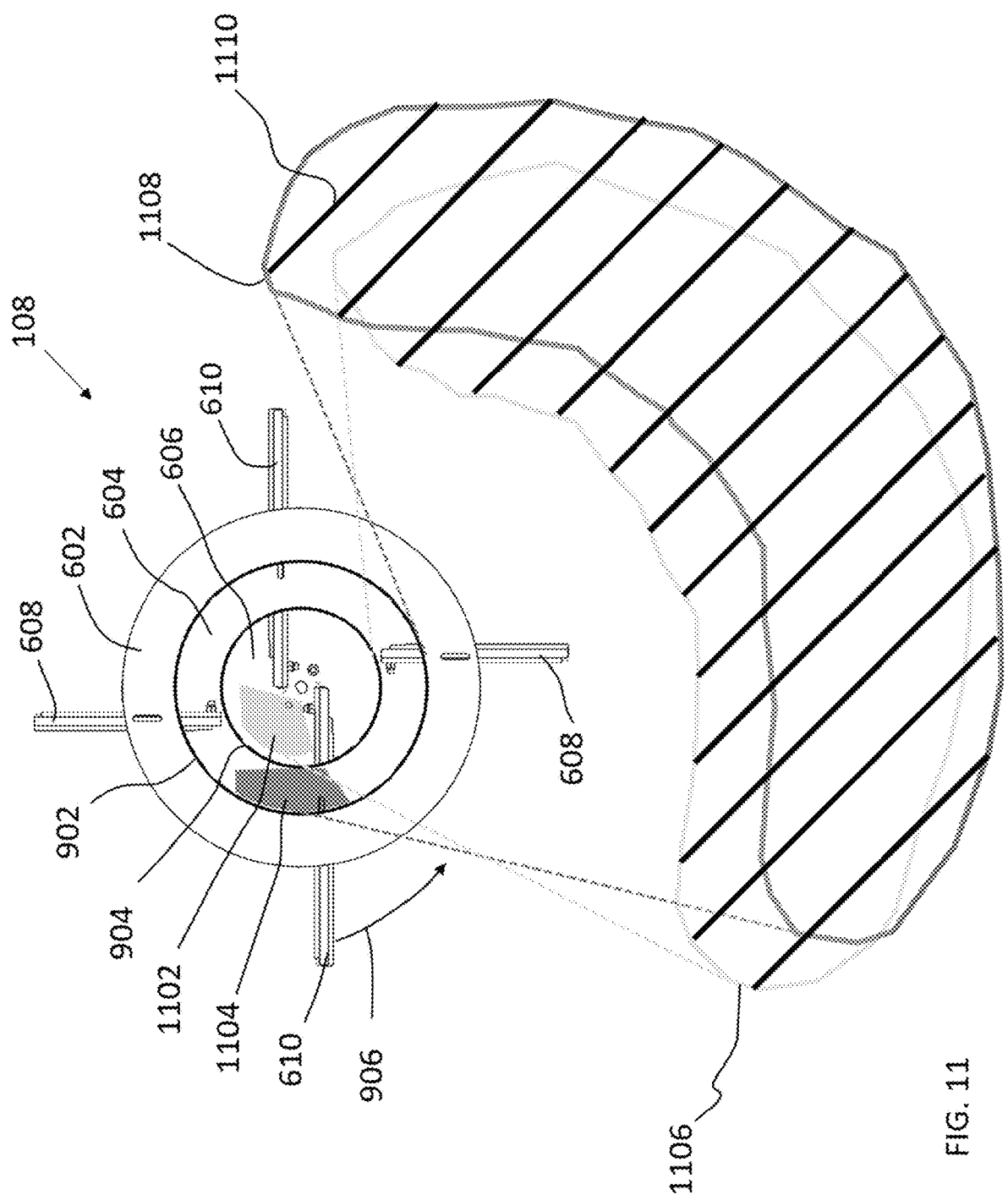
FIG. 11 shows detail of the right-hand centrifugal disk, material drop points formed by the chutes and the resulting kidney bean distribution pattern in accordance with one embodiment.

FIG. 11 shows detail of the right-hand spinner 108, material drop points 1102 and 1104 formed by the chutes 618 and 620 and the resulting kidney bean distribution pattern 1106, 1108 and 1110 in accordance with one embodiment. Inner chute 618 produces material drop point orifice shape 1102 and outer chute 620 produces material drop point orifice shape 1104. The waterfall dividers 110 and 112 and material divider 114 separates the material being discharged into columns of equal measure into the chutes 618 and 620 for placement onto the spinner 108. The chutes 618 and 620 having walls so that the particle flow evenly distributes across material drop points 1102 and 1104 starting toward the center of the disk and fills in away from the center as the volume of particles in chute 618 and 620 increases. The inner chute drop point orifice 1102 produces kidney bean distribution pattern 1106 and outer chute drop point orifice 1104 produces kidney bean distribution pattern 1108 resulting in the combined kidney bean distribution pattern 1110.

Figure 12:
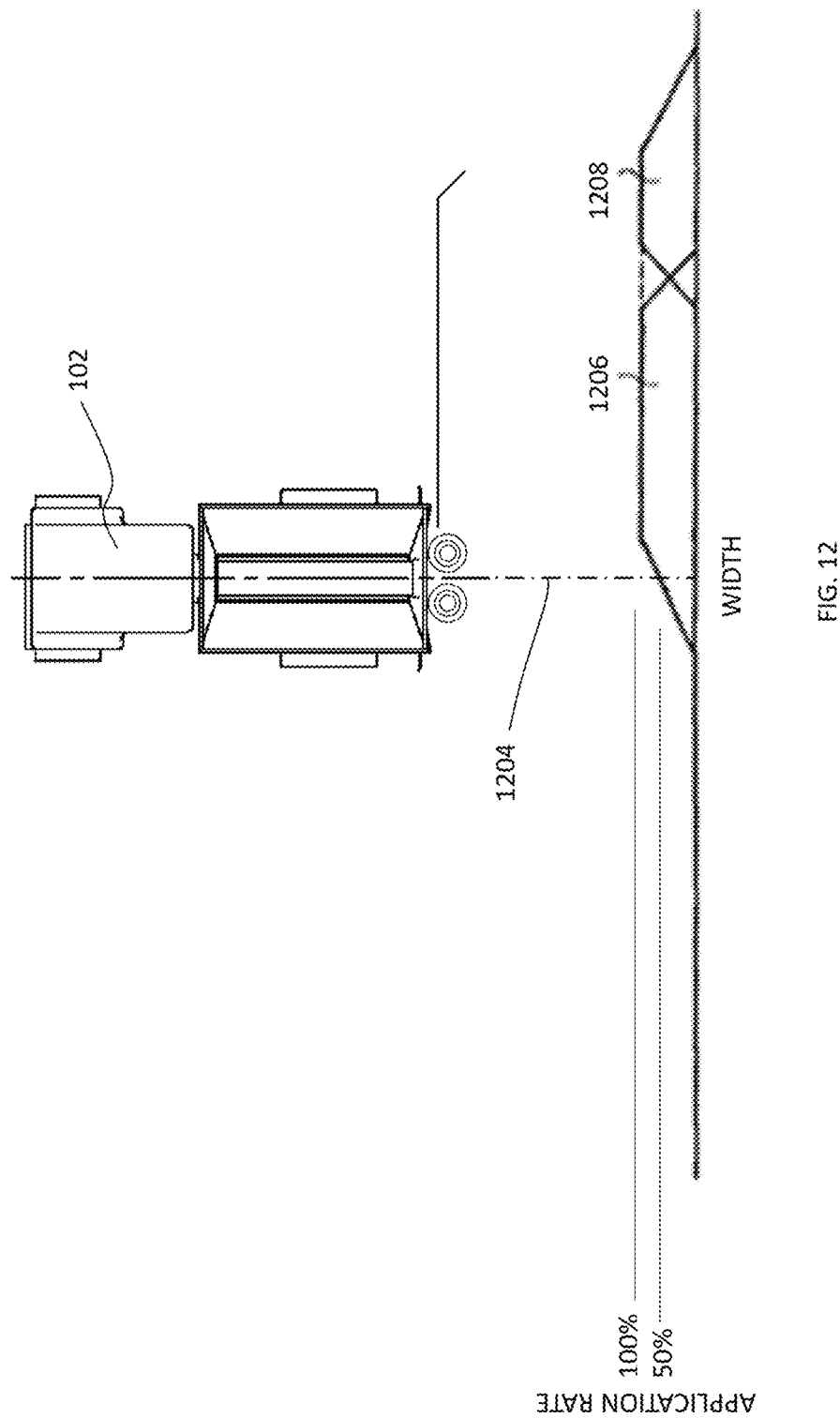
FIG. 12 is a spread pattern symmetry associated with the chute positions and material drop point orifice shape associated with FIG. 11 in accordance with one embodiment.

FIG. 12 shows a simplified representation of the resulting spread pattern of a truck mounted spreader 102, shown in FIG. 11 if tested to a known standard such as ASABE S341.4. Centerline of travel 1204 coincides with the center of the spreader 102. The right-hand inner chute kidney bean distribution pattern 1106 produces simplified pattern 1206 and the right-hand outer chute kidney bean distribution pattern 1108 produces simplified pattern 1208. The resulting right-hand kidney bean distribution pattern 1110 is the combination of simplified patterns 1206 and 1208 with overlaps that produce a uniform distribution pattern for asymmetrical spreading.

Figure 13:
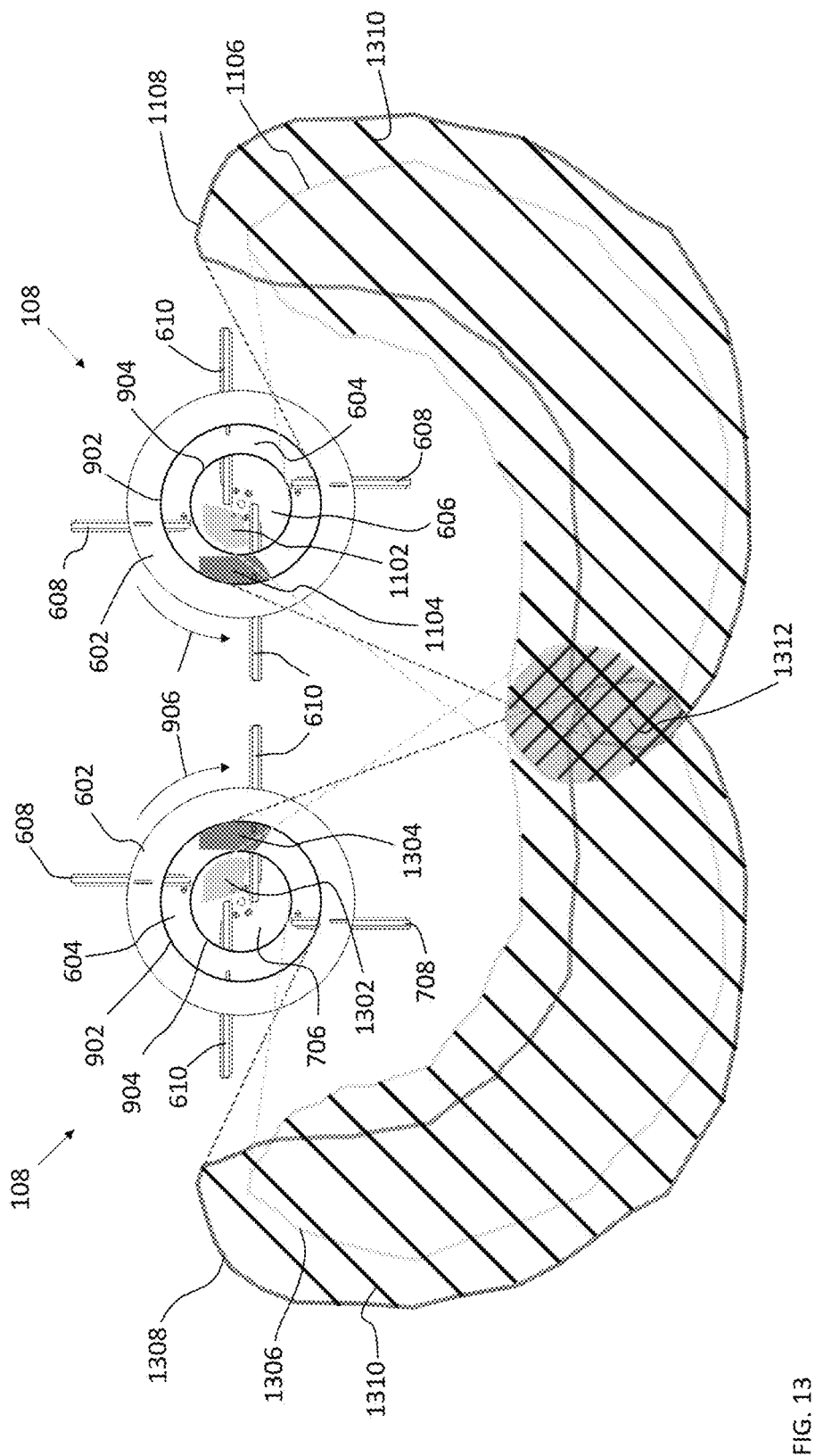
FIG. 13 shows detail of both the right-hand and left-hand centrifugal disk, material drop points formed by the chutes and the resulting kidney bean distribution pattern in accordance with one embodiment.

FIG. 13 is in the same embodiment of FIG. 11, showing the combined distribution pattern on the ground associated with material being spread through both the left-hand and right-hand spinner 108. Material drop point orifice shapes 1302 and 1304 are formed by chutes 618 and 620, respectively, mounted above the left-hand spinner 108. The left-hand inner chute kidney bean distribution pattern 1306 is produced by material drop point orifice shape 1302 and the left-hand outer chute kidney bean distribution pattern 1308 is produced by material drop point orifice shape 1304. The resulting combined right-hand and left-hand kidney bean distribution pattern 1310 is the summation of the kidney bean patterns produced by both the left-hand and right-hand spinner 108. The center kidney bean distribution 1312 is the summation of the overlap of kidney bean patterns in the center and is highly sensitive to overlap. Too much overlap and the center of the distribution pattern 1312 will have too much material directly behind the spreader and too little overlap will result in not enough material to produce an overall uniform symmetric distribution.

Figure 14:
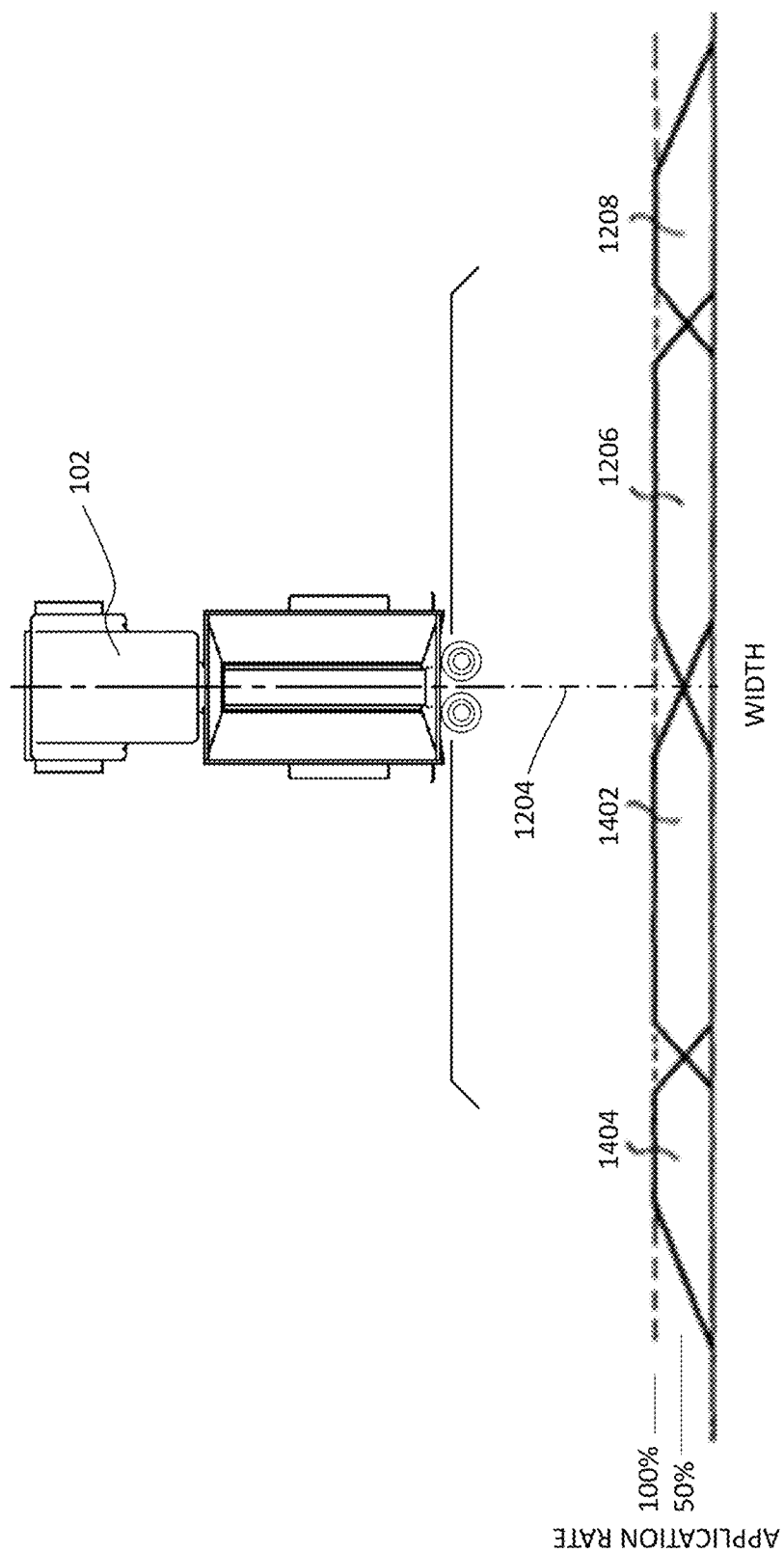
FIG. 14 is a spread pattern symmetry associated with the chute positions and material drop point orifice shape associated with FIG. 13 in accordance with one embodiment.

FIG. 14 shows a simplified representation of the resulting spread pattern of a truck mounted spreader 102, shown in FIG. 13 if tested to a known standard such as ASABE S341.4. Centerline of travel 1204 coincides with the center of the spreader 102. The right-hand inner chute kidney bean distribution pattern 1106 produces simplified pattern 1206, right-hand outer chute kidney bean distribution pattern 1108 produces simplified pattern 1208, left-hand inner chute kidney bean distribution pattern 1306 produces simplified pattern 1402 and left-hand outer chute kidney bean distribution pattern 1308 produces simplified pattern 1404. The resulting overall pattern is the combination of simplified patterns 1206, 1208, 1402 and 1404 with overlaps that produce a uniform distribution pattern for symmetrical spreading.

Figure 15:
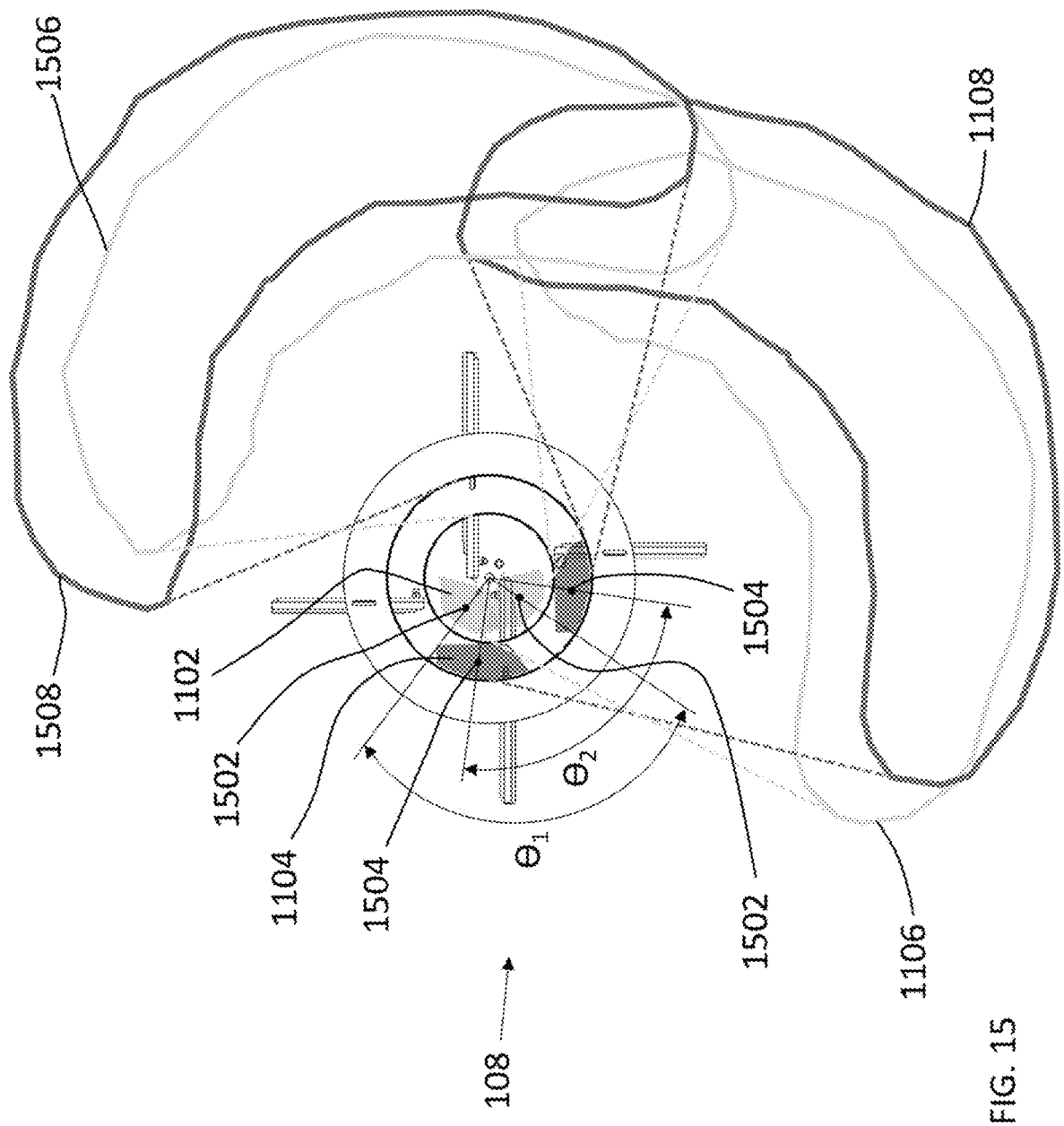
FIG. 15 is the same representation as FIG. 11, but with additional details on the adjustability of the material drop point orifice shapes around the centrifugal disks in accordance with one embodiment.

FIG. 15 is in the same embodiment of FIG. 11 with details on the angular adjustability of the inner and outer chute material drop point orifice shapes 1102 and 1104 respectively around the spinner 108. The angular rotation of the inner chute $\theta_1$ around the spinner 108 is represented the rotation of the inner chute drop point centroid 1502 resulting in a rotation of the inner chute kidney bean distribution 1506. The angular rotation of the outer chute $\theta_2$ around the spinner 108 is represented the rotation of the outer chute drop point centroid 1504 resulting in a rotation of the outer chute kidney bean distribution 1508. The angular adjustability of material drop point orifice shapes 1102 and 1104 are independently adjustable around the spinner 108. The angular adjustability of material drop point orifice shapes 1302 and 1304 around the left-hand centrifugal disks 108 are not shown but function the same. In this embodiment, inner and outer centroids 1502 and 1504 respectively are positioned at about 0° and angle $\theta_1$ and $\theta_2$ is about 22.5°. The chutes 618 and 620 are capable of rotating about 22.5° the opposite direction shown (−22.5°) for a total of about 45° of adjustment to precisely control the distribution of material due to variations in materials, external forces, field conditions, avoiding waterways, field boundaries, etc.

Figure 16:
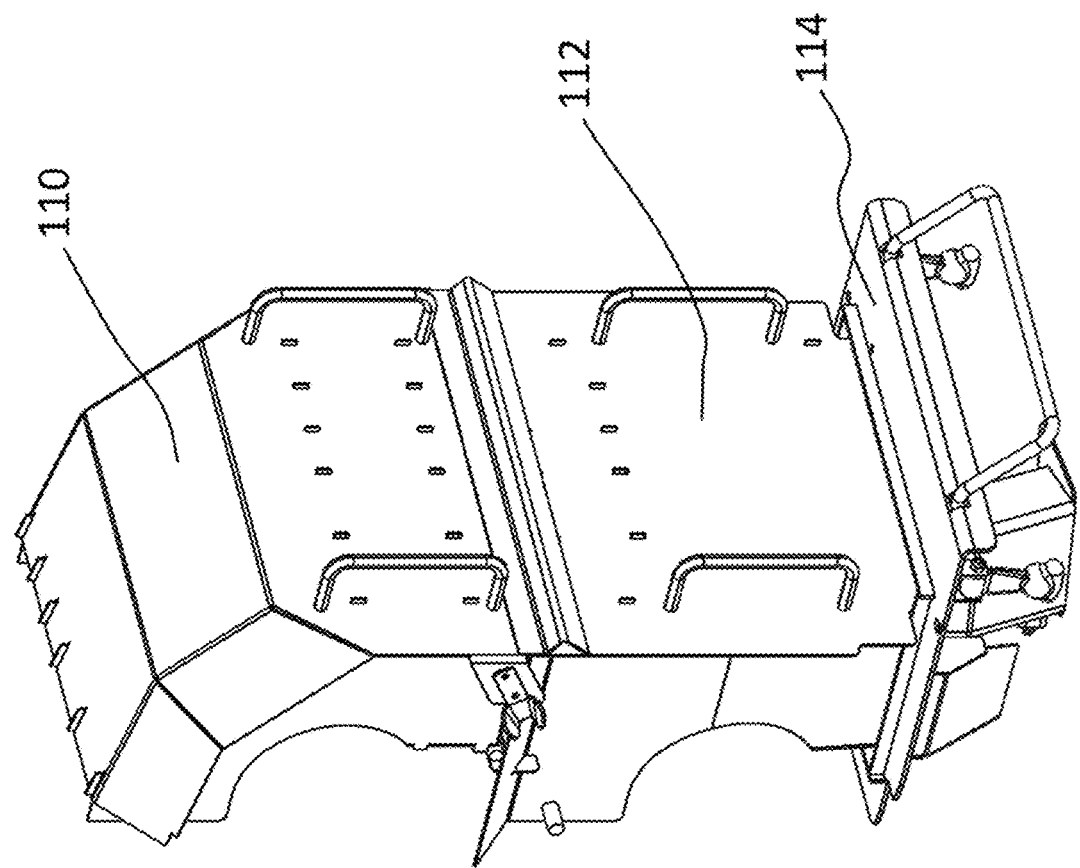
FIGS. 16 and 17 shows detail of the waterfall dividers and material divider in accordance with one embodiment.
Figure 17:
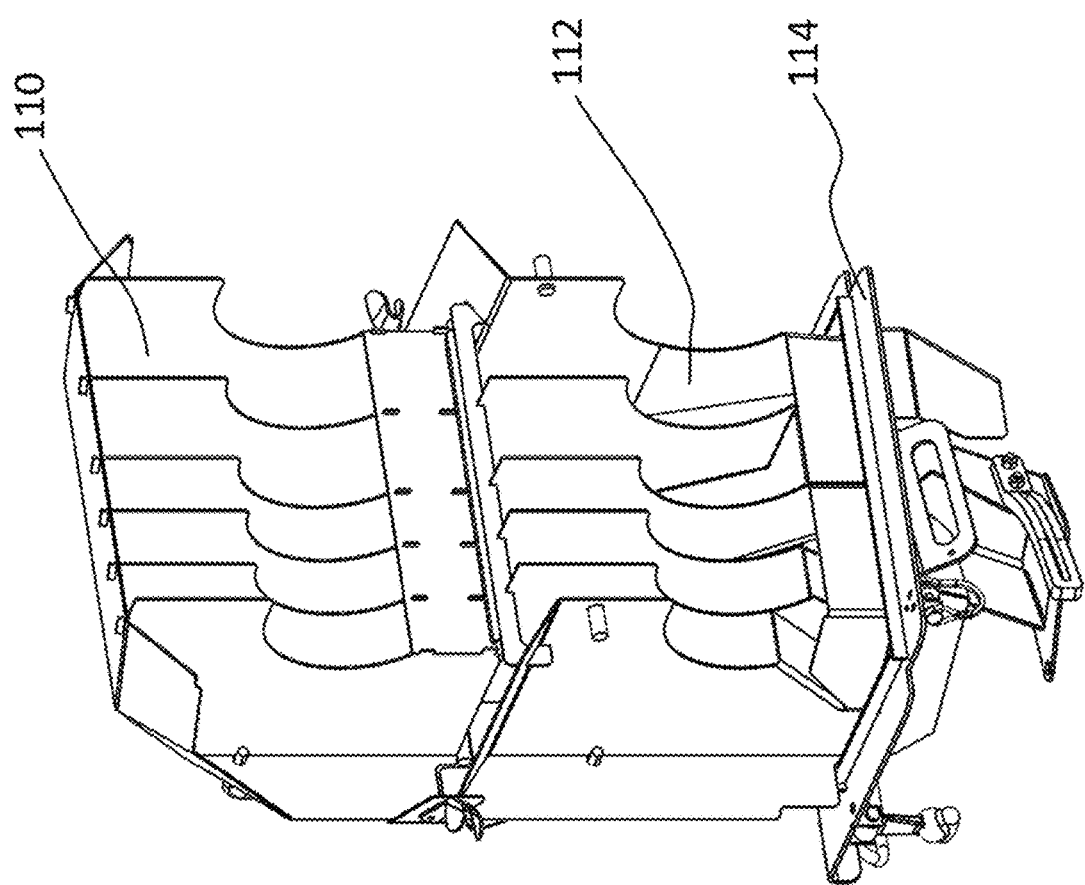
Figure 18:
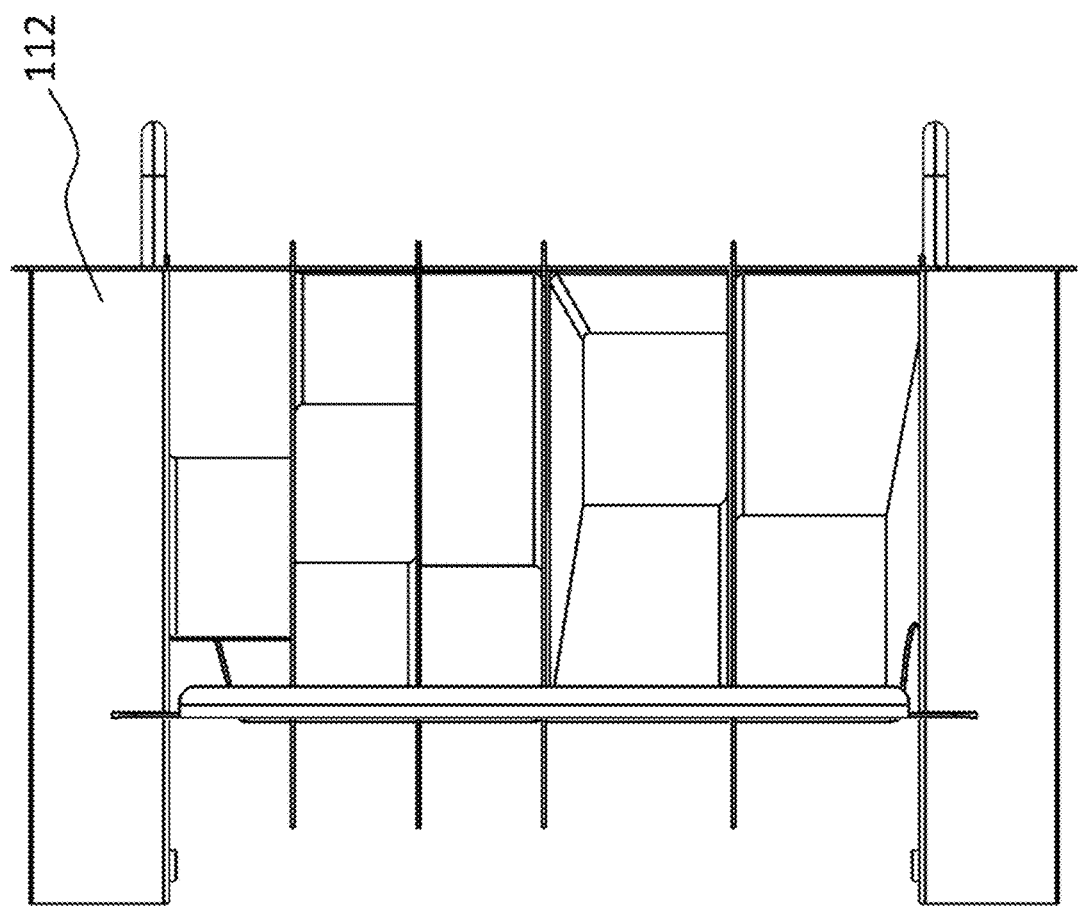
FIG. 18 shows a bird's eye view of the bottom waterfall divider and detail of its structure in accordance with one embodiment.

FIGS. 16 to 18 show the top waterfall divider 110, bottom waterfall divider 112 and material divider 114 with additional detail of the structure that separates the material being discharged into columns of equal measure into the material divider 114 and onto the spinner 108.

Figure 19:
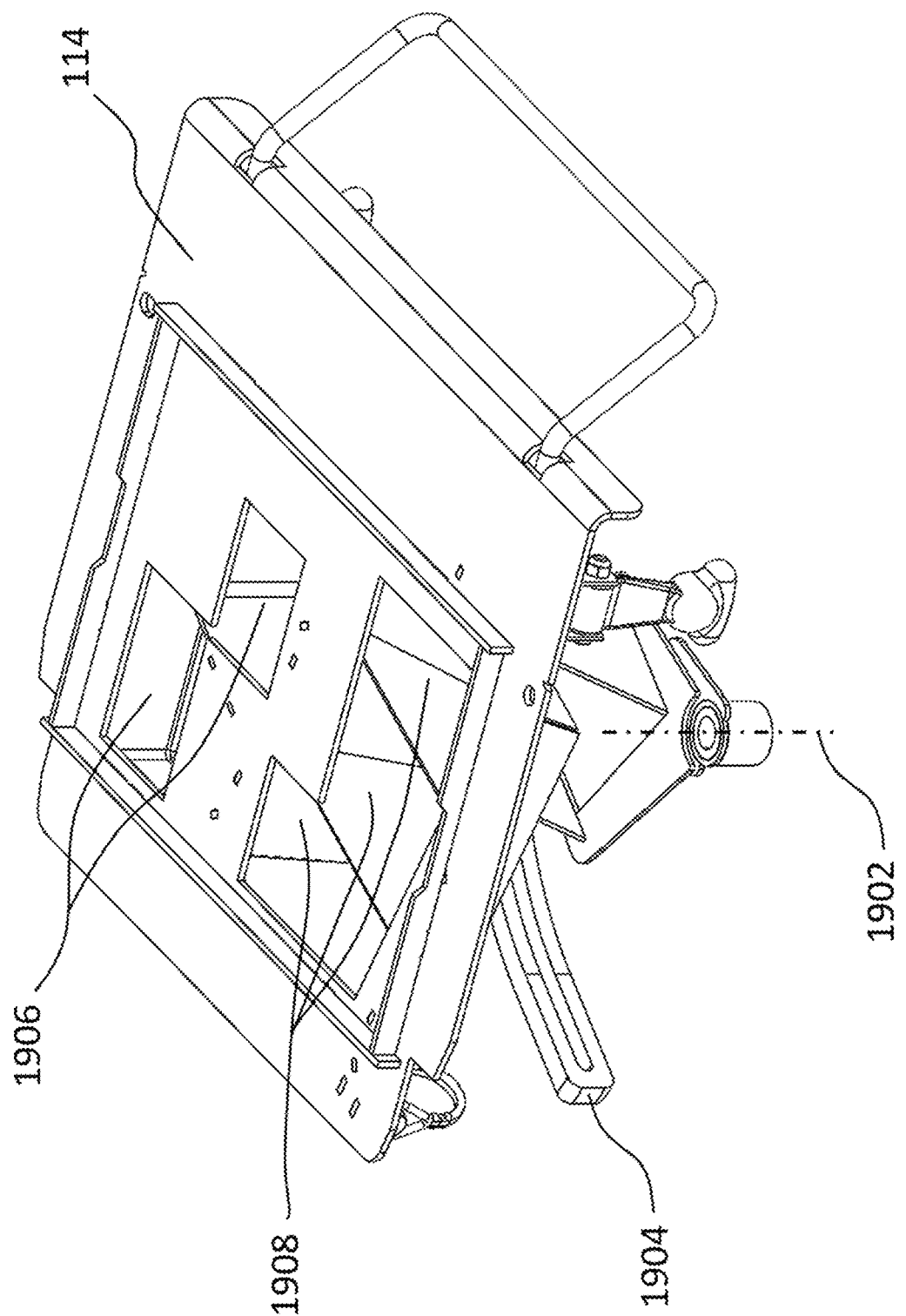
FIGS. 19 and 20 show detail of the material divider in accordance with one embodiment.
Figure 20:
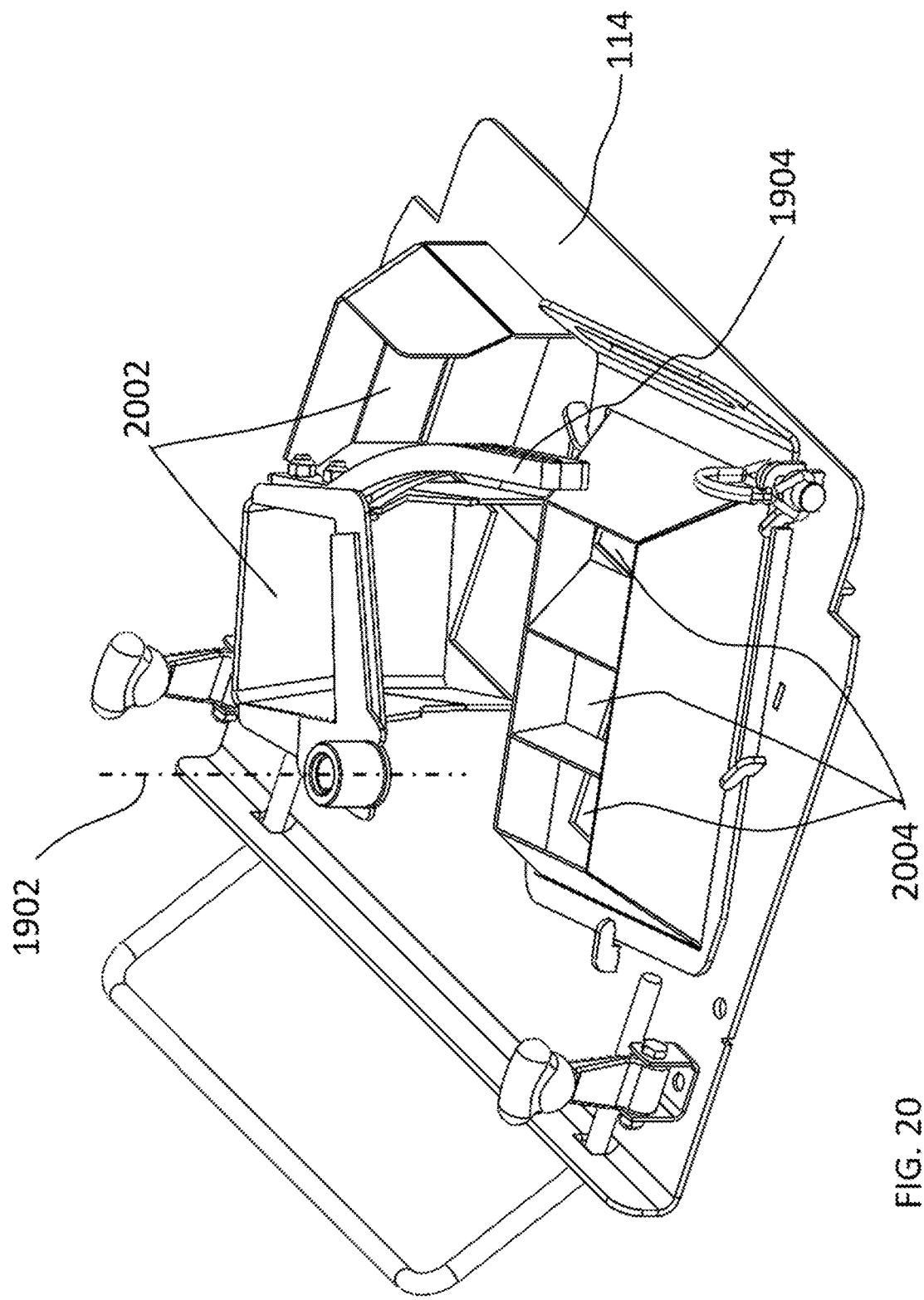

FIGS. 19 to 20 show the material divider 114 with additional detail on the structure that separates the material being discharged into columns of equal measure into the chutes 618 and 620 and onto the spinner 108. The material divider 114 includes structure for the outer chute pivot 1902 and the outer chute guide 1904. Discharged material flows in equal measure into the inner chute inlet orifices 1906 and outer chute inlet orifice 1908 and exits through outlet orifices 2002 and 2004 respectively.

Figure 21:
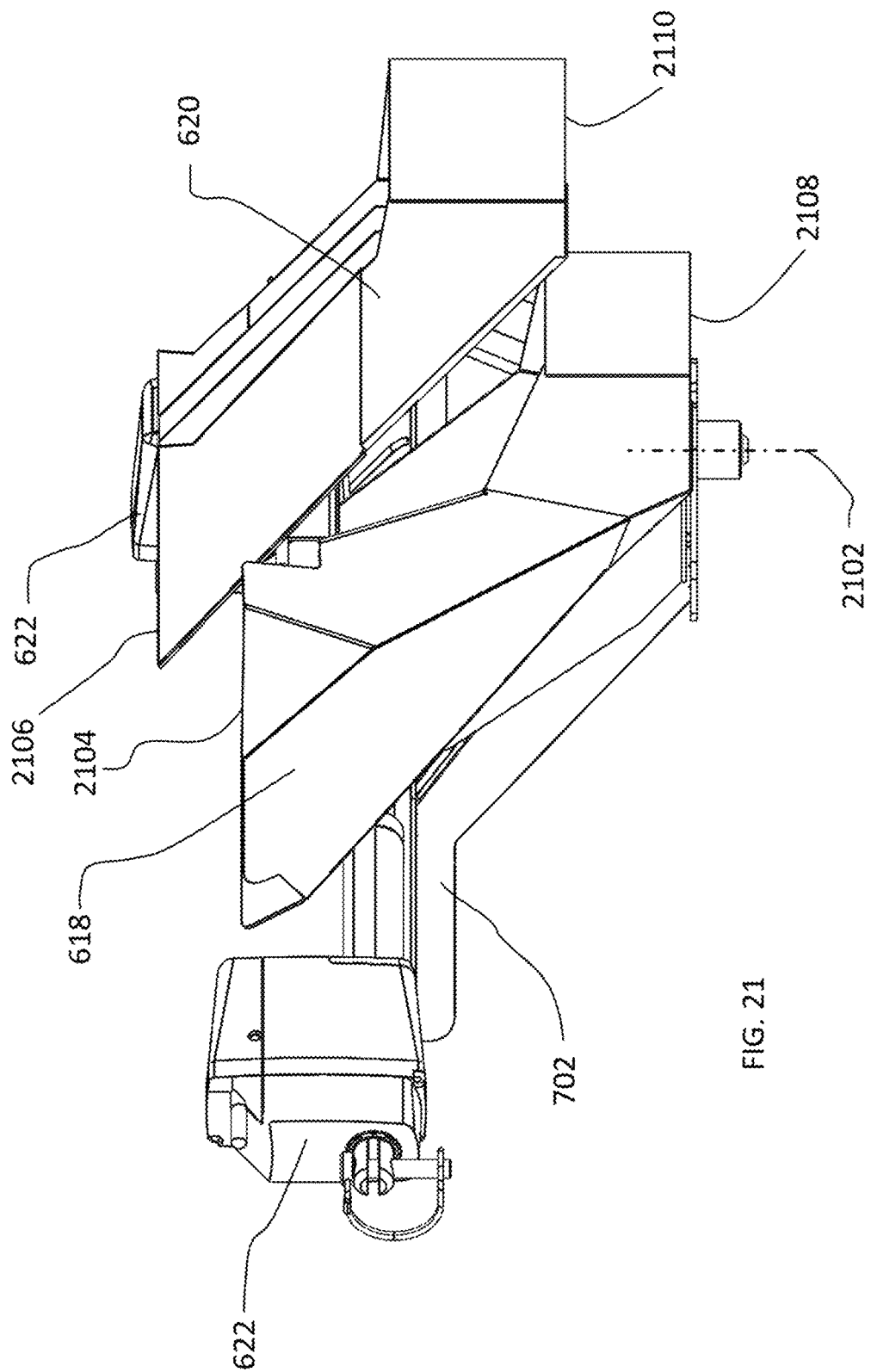
FIG. 21 shows detail of the chutes, drive mechanisms and structure in accordance with one embodiment.

FIG. 21 shows the chutes 618 and 622 with additional details on their structure, support frame 702 and the inner chute pivot axis 2102. The support frame 702 is mounted below the material divider 114. Material being discharged from conveyor discharge ends 202, 204, 206, and 208 is separated into columns by the waterfall dividers 110 and 112. The bottom waterfall divider 112 divides half of the discharged material into the material divider inlet orifices for the inner chute 1906 and the other half into the material divider inlet orifices for the outer chute 1906. Discharged material then exits the material divider 114 through material divider outlet orifices for the inner chute 2002 and material divider outlet orifices for the outer chute 2004. Positioned below the material divider outlet orifices 2002 and 2004 are the inner and outer chutes 618 and 622 respectively. Material flows out of the material divider outlet orifices 2002 and 2004 and into the inner chute inlet orifice 2104 and outer chute inlet orifice 2106. Material exits the chutes 618 and 622 through inner chute outlet orifice 2108 and outer chute outlet orifice 2110 which forms the material drop point orifice shapes 1102, 1104, 1302 and 1304 over the spinner 108. The inner chute 618 is rotationally pivotably around inner chute pivot 2102 which coincides with the center vertical axis of the spinner 624. The outer chute 622 is rotationally pivotably around outer chute pivot 1902 which coincides with the center vertical axis of the spinner 624 and inner chute pivot 2102.

Figure 22:
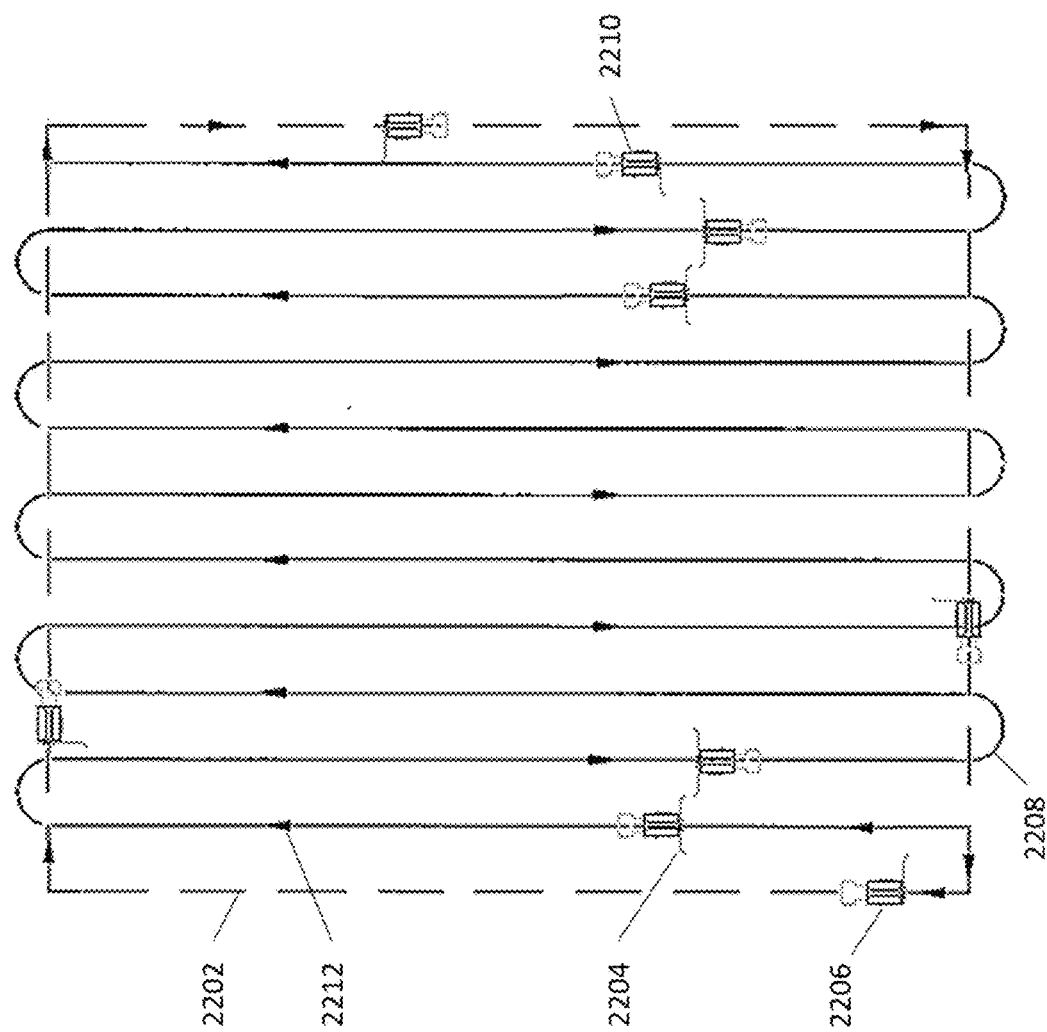
FIG. 22 shows an example of a back-and-forth spreading approach of the prior art.

FIG. 22 shows a simplified representation of a back-and-forth pattern 2208 approach for spreading a field at a constant fertilizer rate (lbs/acre) of the prior art. A typical approach for spreading a field is to spread the boundary 2202 then the remaining field is spread by a back-and-forth pattern 2208. The driving centers of the back-and-forth pattern 2208 is determined by the effective swath width of the spreader and the edge overlap at the outside edges of the distribution to produce an overall uniform distribution. Often, the last pass 2210 of the back-and-forth pattern requires a more precise asymmetric swath to prevent unnecessary overlap. Simple representations of border spreading 2206, common symmetric spreading 2204, direction of travel 2212, and last pass spreading 2210 are shown.

Figure 23:
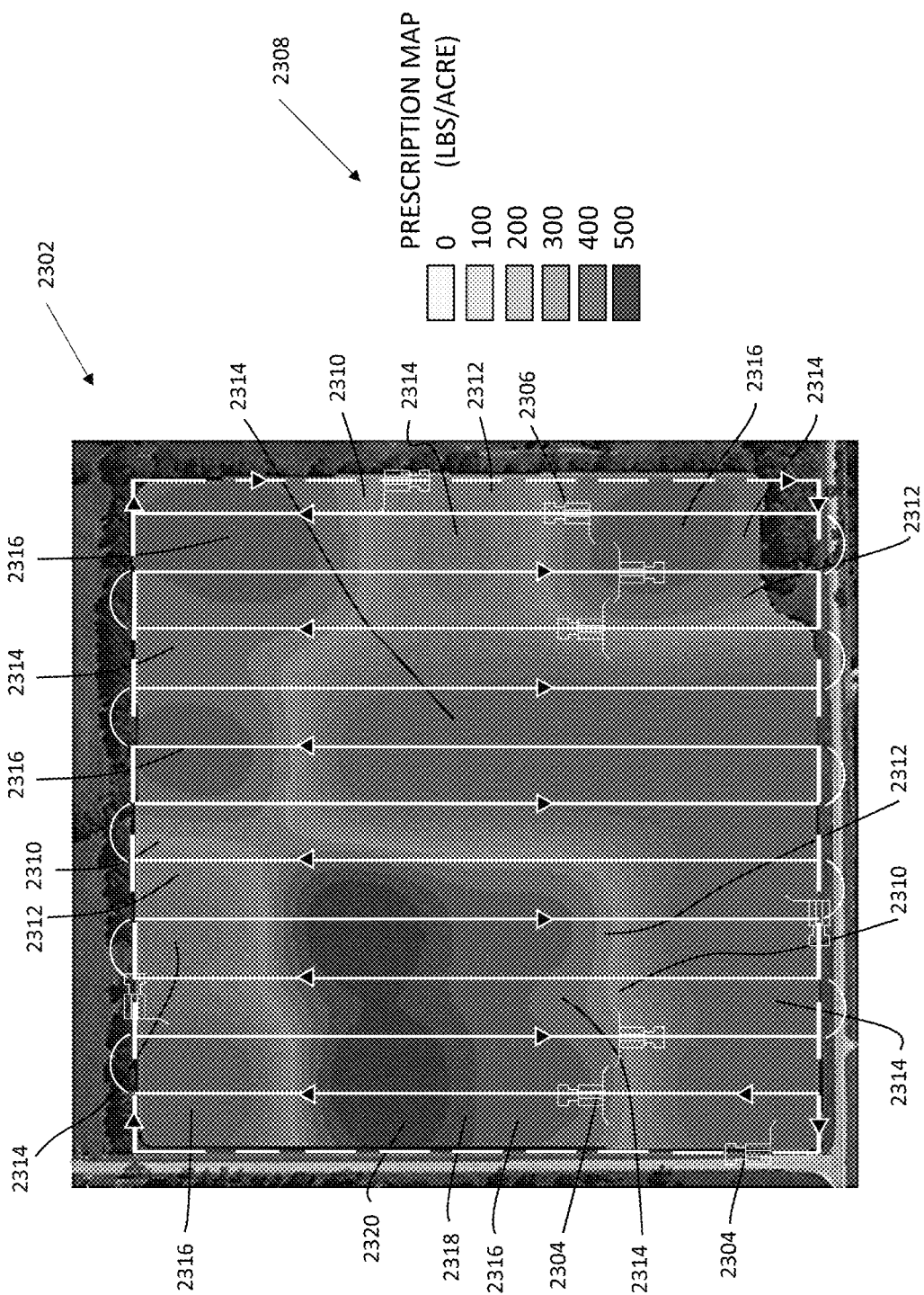
FIG. 23 shows FIG. 22 overlaid with a VRT prescription map.

FIG. 23 shows a hypothetical simplified representation of a back-and-forth pattern 2208 approach for spreading a field overlaid with a VRT prescription map 2302. In this embodiment, the field's nutrient requirements vary and requires the spreader to change fertilizer rates (lbs/acre) throughout the field. 2310 shows areas of the field requiring no fertilizer, 2312 shows areas of the field requiring 100 lbs/acre of fertilizer, 2314 shows areas of the field requiring 200 lbs/acre of fertilizer, 2316 shows areas of the field requiring 300 lbs/acre of fertilizer, 2318 shows areas of the field requiring 400 lbs/acre of fertilizer and 2320 shows areas of the field requiring 500 lbs/acre of fertilizer. 2308 shows the prescription map legend highlighting the field's fertilizer requirements. To spread this field as efficient and precise as possible requires a wide precise swath width (ft), high material throughput (cfm) and high travel speed (mph). The embodiment of FIG. 1 can spread this field at a wide precise swath (ft), high material throughput (cfm) and high travel speed (mph) by:

Increasing the acceleration imparted on the material being discharged onto the spinners by use of endless conveyors 302, 304, 402 and 404.

Utilizing a tiered disk spinner 108 which divides material being discharged on each spinner 108 onto two separate centrifugal disks 604 and 606. This allows each centrifugal disk 604 and 608 and their respective throwing vanes 608 and 610 respectively to precisely spread material from low rates to high rates without overloading them. Often, a spinner and its throwing vanes can precisely spread a defined throughput but once that throughput is reached the precision of material being spread is reduced. The amount of material over the defined throughput often ends up directly behind the spreader resulting in the center of the spread pattern with too much material which can be detrimental to crop development and wasteful of expensive fertilizer. Simply adding more throwing vanes does not solve the problem. By utilizing a tiered disk spinner 108, the throughput of each spinner is essentially doubled allowing the spreader to spread a wide swath at high travel speeds.

Utilizing a spinner motor 116 capable of high rotational speed (rpm) and throwing vanes 608 and 610 with a large effective radius of rotation to impart a high acceleration on the material being spread resulting in a wide swath width. The spinner motor 116 rotational speed may be as low as 400 rpm but in some embodiments up to and including 1100 rpm. Throwing vanes 608 and 610 in the embodiment of FIG. 1 may have an effective radius of 18 inches, but in some embodiments may be as short as 11 inches or as long as 22 inches. Throwing vane 608 in the embodiment of FIG. 1 is in the shape of a straight c-channel and throwing vane 610 is in the shape of a lofted c-channel with about 7° of loft, however they can have different shapes and lofts angles based on material conditions, desired swath width, etc.

One approach for spreading a field with VRT prescription 2302 with a spreader in the embodiment of FIG. 1 is to spread the field boundary first by adjusting the spreader 102 for asymmetrical border spreading 2304 by shutting off the left-hand endless conveyors 402 and 404 and spinner 108. The variable rate around the border would be accomplished by adjusting the rotational speed of the right-hand endless conveyors 302 and 304 and spinner 108 to meet the needed prescription rate and asymmetrical pattern. Note, once the spreader is calibrated, the chutes 618 and 622 do not need to be adjusted for variation in fertilizer application rates. The remaining field is spread by a back-and-forth pattern with the spreader 102 adjusted for common symmetric spreading 2304 by turning on the left-hand endless conveyors 402 and 404 and spinner 108. The variable rate throughout the back-and-forth pattern would be accomplished by adjusting the rotational speed of the endless conveyors 302, 304, 402 and 404 and both spinners 108 independently of each other to meet the needed prescription rate and symmetrical pattern. Note, the driving centers of the back-and-forth pattern is determined by the effective swath width of the spreader 102 and the edge overlap at the outside edges of the distribution to produce an overall uniform distribution. Often, the last pass 2306 of the back-and-forth pattern requires a more precise asymmetric swath to prevent unnecessary overlap. The spreader 102 would adjust for this by turning off the right-hand endless conveyors 302 and 304 and spinner 108 and adjusting the left-hand endless conveyors 402 and 404 and spinner 108 to meet the needed prescription rate and asymmetrical pattern.

Figure 24:
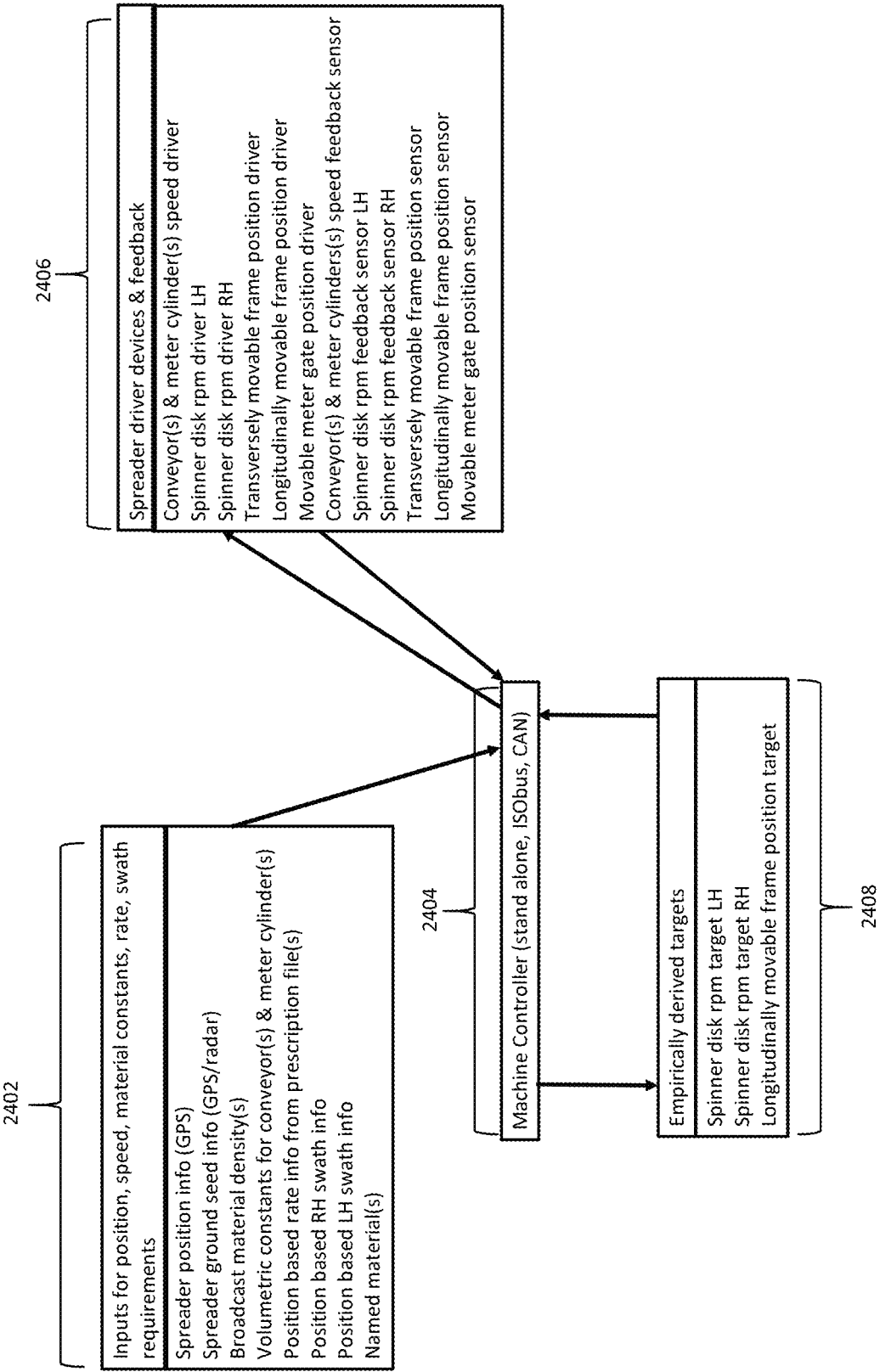
FIG. 24 is a diagrammatic overview of a control system of the prior art.
Figure 25:
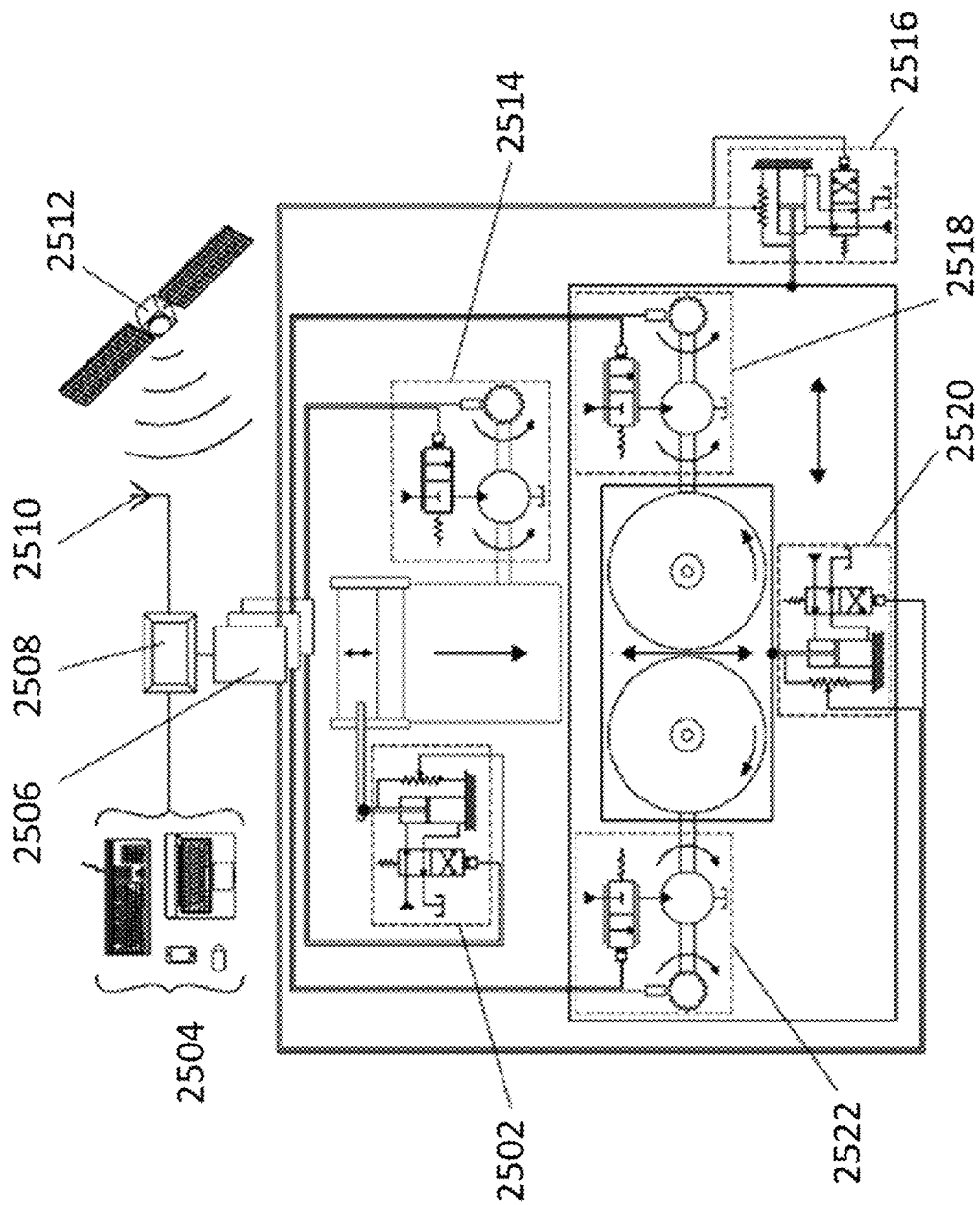
FIG. 25 is a depiction of a system of the prior art in its intended environment.

FIGS. 24 to 25 is shown simplified diagrammatic overviews of control system elements of the prior art. The control system elements for the present invention is an advancement from U.S. Pat. No. 9,649,646. The prior patent is incorporated herein by reference in its entirety.

The machine controller element generally designated 2404 comprising electronics, software, and user interfaces. The machine controller element 2404 can take many different physical forms from a single, stand-alone box including all electronics, software, and a user interface, to a user interface 2508 and a plurality of boxes 2506 at different locations and with different functions. A machine controller element 2404 with a plurality of boxes 2506 and a user interface 2508 are often connected via ISO Bus or CAN Bus networks. This machine controller element 2404 processes information and initiates machine actions based on external input elements generally designated 2402, empirically derived target elements generally designated 2408, and feedback from spreader device elements generally designated 2406.

The external input elements 2402 comprises inputs that define spreader position and speed through a Global Positioning System (GPS) pictorially shown as a GPS satellite 2512 and a GPS receiver 2510. In combination with speed and position information, the external input elements 2402 also include variable symmetrical or asymmetrical swath width definitions, variable rate nutrient prescription files, nutrient material densities, and conveyor metering volumetric constants inputs that are used by the machine controller element 2404 to meter the correct volume of material for variable rates and swath widths. Material ID or named material inputs are used for association with, and editing of, the empirically derived target elements 2408 as it is understood from previous descriptions materials have unique size, shape, density, and hardness that affect spread characteristics. These external input elements 2402 may be entered into the machine controller element 2404 via the user interface 2508 or any number of devices, wireless or wired to the controller element, such as laptop computers, keyboards, phones, flash drives, memory cards, etc. that are generally shown 2504.

Empirically derived target elements 2408 include information needed to control symmetrical or asymmetrical variable swath widths for named materials broadcast at variable rates. The type of information contained in the empirically derived target elements 2408 includes the spinner disk rpm for desired widths of a named material as well as movable frame positions needed for desired broadcast pattern symmetry. Empirically derived elements 2408 are determined by field tests common to prior art spreaders.

The spreader device elements 2406 include drivers and feedback for conveyor speed 2514, independent spinner rpm 2522, transversely movable frame position 2516, longitudinally moveable frame position 2520, and movable metering gate 2502 per the needs of the external driver elements 2402 and empirically derived target elements 2408.

Figure 26:
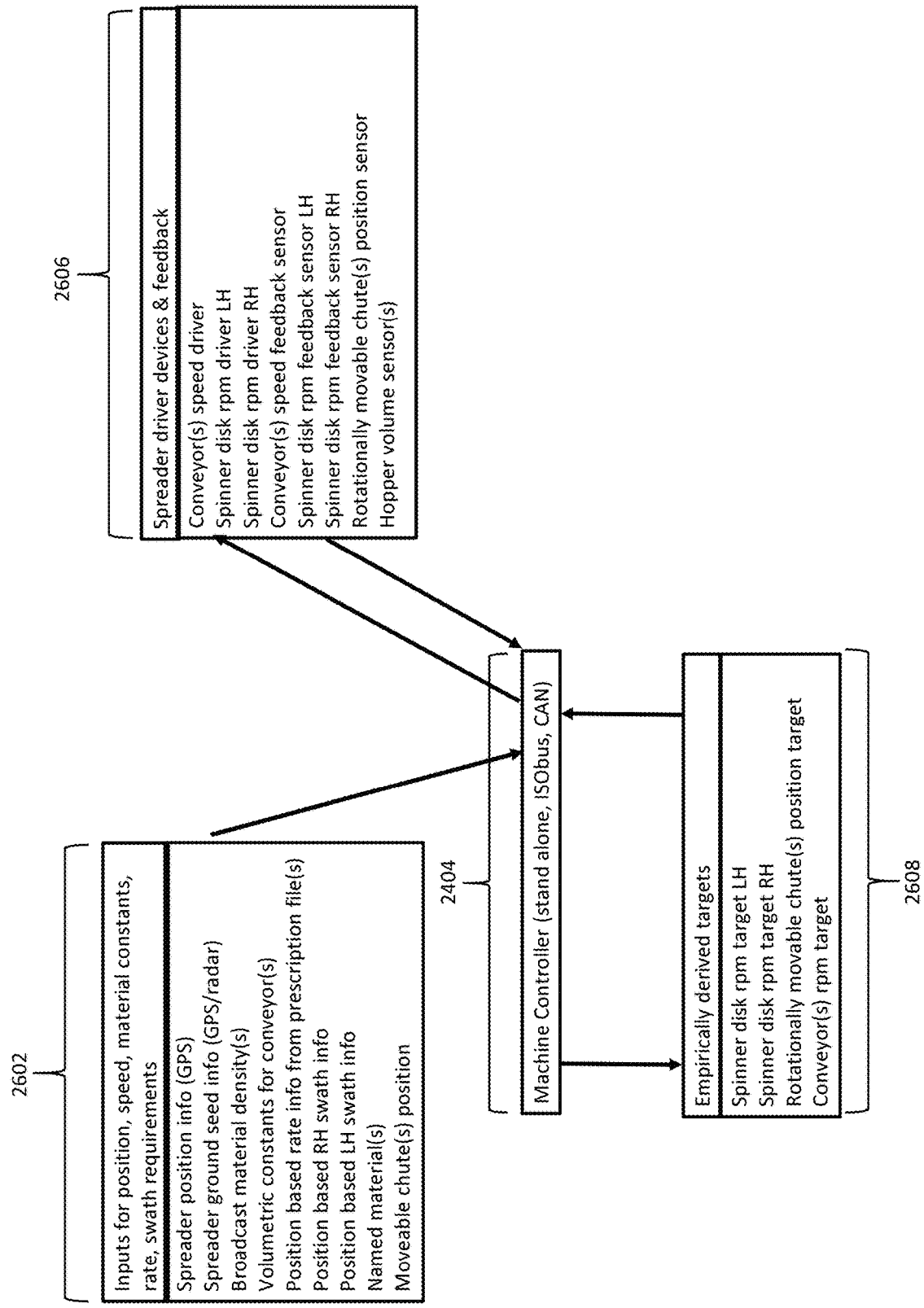
FIG. 26 is a diagrammatic overview of a control system for the present invention.
Figure 27:
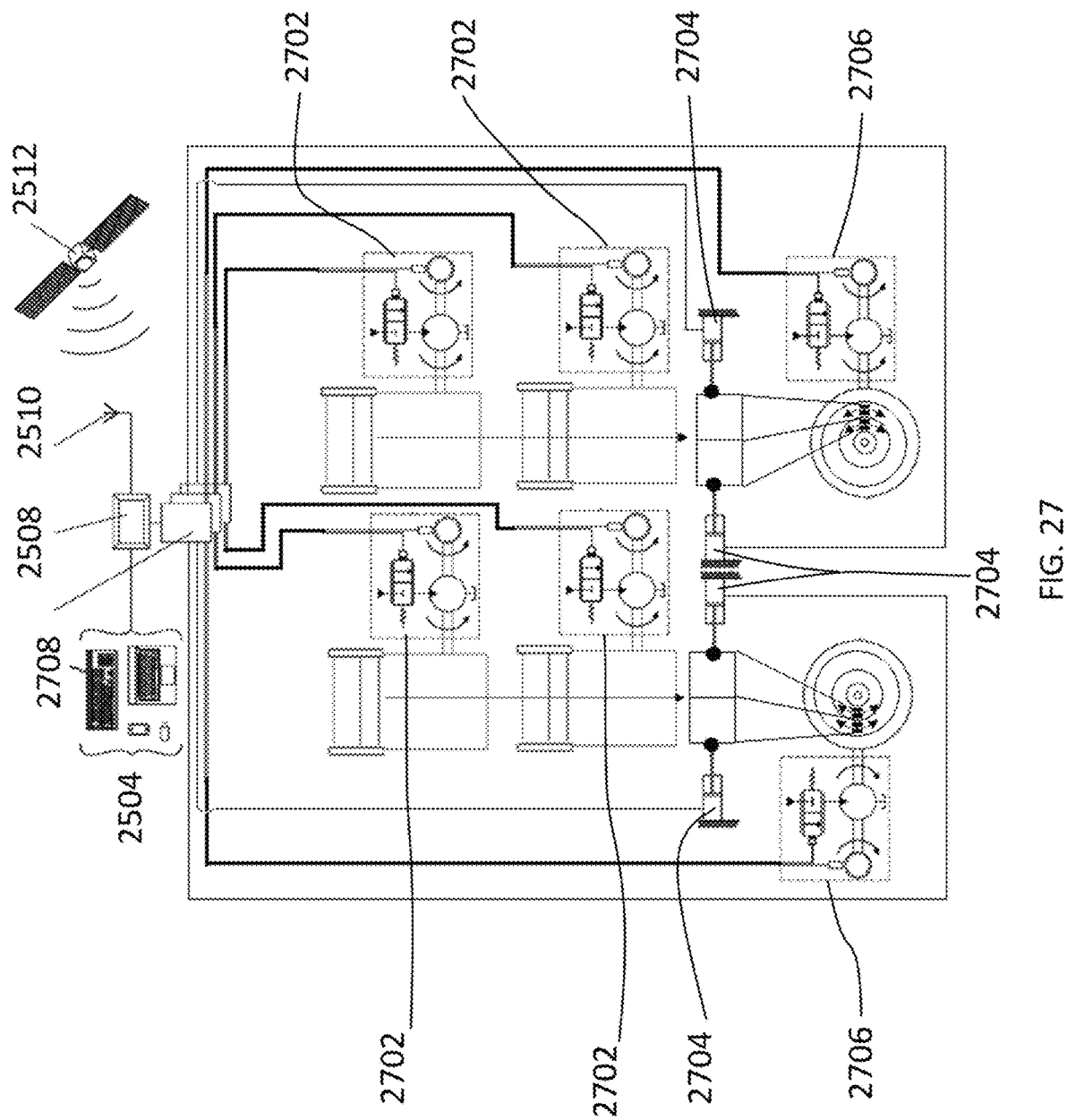
FIG. 27 is a depiction of a system of the present invention in its intended environment.

FIGS. 26 to 27 differ from the embodiments according to FIGS. 24 and 25 in that the simplified diagrammatic overviews of control system elements for the embodiment of FIG. 1 includes plurality of boxes 2708, spreader device elements 2606, external input elements 2602, empirically derived target elements 2608, drivers and feedback for conveyor speed 2702, independent spinner rpm 2706, and drivers and feedback for chute rotation 2704.

The machine controller element 2404 processes information and initiates machine actions based on external input elements generally designated 2602, empirically derived target elements generally designated 2608, and feedback from spreader device elements generally designated 2606. In combination with speed and position information, the external input elements 2602 are now augmented with additional spreader device elements shown in 2606 and include variable symmetrical or asymmetrical swath width definitions, variable rate nutrient prescription files, nutrient material densities, and conveyor metering volumetric constants inputs that are used by the machine controller element 2404 to meter the correct volume of material for variable rates and swath widths. The spreader device element 2606 include drivers and feedback for conveyor speed 2702, independent spinner rpm 2706 and rotationally moveable chute position 2704 per the needs of the external driver elements 2602 and empirically derived target elements 2608.

It is understood that all elements of FIG. 26 can be applied to single or multi-compartment spreaders. Those skilled in the art of designing automated broadcast spreader systems may create a system which is different from those shown here however it is believed that various modifications and changes to the systems described could be made without deviating from the spirit and scope of the present invention.

We claim:

1. A method for spreading particulate material across a field with increased application rate, swath width, driving speed, and control of pattern comprising the steps of:
   providing a conveyor;
   providing a material divider;
   providing a first flow directing member;
   providing a second flow directing member;
   providing a spinner;
   distributing said particulate material in a non-static pattern by:
   conveying said particulate material onto said spinners utilizing said conveyor, said material divider, said first flow directing member, said second flow directing member,
   wherein each of said first flow directing member and said second flow directing member is configured to rotate around a common axis so as to direct flow of said particulate material around said common axis and said spinner, where said common axis is a non-horizontal common axis; and
   wherein each of said first flow directing member and said second flow directing member is configured to direct particulate material flow in a configurable shape in separate and distinct locations onto said spinner.

2. The method of claim 1 wherein said first flow directing member and said second flow directing member include a distinct flow directing orifice; and wherein said material divider separates the particulate material into columns of equal measure into said first flow directing member and said second flow directing member further comprising the step of:
   adjusting said non-static pattern by rotating one of said first flow directing member and said second flow directing member around said common axis.

3. The method of claim 2 wherein said spinner comprises:
   a barrier configured to direct stray affect deflected grains of said particulate material onto said spinner;
   a plurality of separated centrifugal disks;
   a top centrifugal disk, with an annular shape, of said plurality of separated centrifugal disks for permitting passage of said particulate material; and
   said step of adjusting said non-static pattern is done while one of said plurality of separated centrifugal disk is rotating around said common axis.

4. The method of claim 3 wherein said step of adjusting said non-static pattern includes rotating each of said first flow directing member and said second flow directing member around said common axis, and
   wherein the first flow directing member and the second flow directing member are manipulated to obtain a symmetric distribution pattern.

5. The method of claim 3 wherein each of said first flow directing member and said second flow directing member is configured to direct flow of said particulate material from said material divider onto only one of said plurality of separated centrifugal disks.

6. The method of claim 1 wherein said first flow directing member and said second flow directing member is independently configured to direct flow of said particulate material around said common axis.

7. The method of claim 1 wherein said step of distributing said particulate material in a non-static asymmetric pattern comprises one of:
   reducing rotational speed of said spinner;
   reducing flow of said particulate material; and adjusting position of said first flow directing member and said second flow directing member.

* * * * *